(12) United States Patent
Cho

(10) Patent No.: US 10,140,959 B2
(45) Date of Patent: Nov. 27, 2018

(54) MOBILE TERMINAL AND METHOD OF CONTROLLING THE SAME

(71) Applicant: LG ELECTRONICS INC., Seoul (KR)

(72) Inventor: Changseok Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 24 days.

(21) Appl. No.: 14/762,157

(22) PCT Filed: Sep. 22, 2014

(86) PCT No.: PCT/KR2014/008797
§ 371 (c)(1),
(2) Date: Jul. 20, 2015

(87) PCT Pub. No.: WO2016/032045
PCT Pub. Date: Mar. 3, 2016

(65) Prior Publication Data
US 2016/0284321 A1    Sep. 29, 2016

(30) Foreign Application Priority Data

Aug. 27, 2014  (KR) .................. 10-2014-0112538

(51) Int. Cl.
*G09G 5/00* (2006.01)
*G09G 5/377* (2006.01)
(Continued)

(52) U.S. Cl.
CPC ........... *G09G 5/377* (2013.01); *G06F 3/0481* (2013.01); *G06F 3/0482* (2013.01);
(Continued)

(58) Field of Classification Search
CPC ... G09G 5/377; G06F 3/04817; G06F 3/0482; G06F 3/04842; G06F 3/04845; G06F 3/0488; G06F 3/04883; G06F 3/033
(Continued)

(56) References Cited

U.S. PATENT DOCUMENTS 8,359,541 B1 *  1/2013  Landry .................. G06F 3/0481
                                                    345/620
2004/0239691 A1 * 12/2004  Sprang ................ G06F 3/04845
                                                    345/651
(Continued)

FOREIGN PATENT DOCUMENTS

EP    2423882    2/2012
EP    2592539    5/2013
(Continued)

OTHER PUBLICATIONS

European Patent Office Application Serial No. 15172530.6, Search Report dated Apr. 18, 2016, 13 pages.

(Continued)

*Primary Examiner* — Xiao Wu
*Assistant Examiner* — Sarah Lhymn
(74) *Attorney, Agent, or Firm* — Lee, Hong, Degerman, Kang & Waimey

(57) ABSTRACT

The present disclosure relates to a mobile terminal capable of outputting graphic objects and a control method thereof. The mobile terminal includes a display unit that is configured to display a home screen page including a plurality of graphic objects, and a controller that is configured to output the plurality of graphic objects on the other region, except for a specific region, of the home screen page, wherein the plurality of graphic objects are output on positions, decided based on a preset condition, on the other region.

16 Claims, 29 Drawing Sheets

(51) Int. Cl.
| | |
|---|---|
| *G06F 3/0482* | (2013.01) |
| *G06F 3/0484* | (2013.01) |
| *G06F 3/0488* | (2013.01) |
| *G06F 3/0481* | (2013.01) |
| *G06K 9/00* | (2006.01) |
| *G09G 5/14* | (2006.01) |
| *G09G 5/373* | (2006.01) |
| *G09G 5/38* | (2006.01) |
| *H04M 1/725* | (2006.01) |

(52) U.S. Cl.
CPC ........ *G06F 3/0488* (2013.01); *G06F 3/04817* (2013.01); *G06F 3/04842* (2013.01); *G06F 3/04845* (2013.01); *G06F 3/04883* (2013.01); *G06K 9/00228* (2013.01); *G09G 5/14* (2013.01); *G09G 5/373* (2013.01); *G09G 5/38* (2013.01); *G06F 2203/04803* (2013.01); *G06F 2203/04804* (2013.01); *G09G 2340/0464* (2013.01); *G09G 2340/12* (2013.01); *G09G 2340/145* (2013.01); *G09G 2354/00* (2013.01); *H04M 1/72522* (2013.01)

(58) Field of Classification Search
USPC ....... 345/619, 620, 621, 622, 623, 625, 628, 345/635, 637
See application file for complete search history.

(56) References Cited

U.S. PATENT DOCUMENTS

| | | | |
|---|---|---|---|
| 2008/0309617 A1* | 12/2008 | Kong | G06F 3/04817 345/157 |
| 2011/0148917 A1 | 6/2011 | Alberth, Jr. et al. | |
| 2014/0195964 A1* | 7/2014 | Park | G06F 3/0486 715/781 |
| 2014/0232739 A1 | 8/2014 | Kim et al. | |
| 2015/0063785 A1* | 3/2015 | Lee | G11B 27/031 386/280 |

FOREIGN PATENT DOCUMENTS

| | | |
|---|---|---|
| EP | 2618547 | 7/2013 |
| KR | 10-0773442 | 11/2007 |
| KR | 10-2012-0055961 | 6/2012 |
| KR | 10-2013-0085711 | 7/2013 |
| WO | 2014/117365 | 8/2014 |

OTHER PUBLICATIONS

European Patent Office Application Serial No. 15172530.6, Search Report dated Feb. 4, 2016, 6 pages.
PCT International Application No. PCT/KR2014/008797, Written Opinion of the International Searching Authority dated Apr. 24, 2015, 1 page.

* cited by examiner

MOBILE TERMINAL AND METHOD OF CONTROLLING THE SAME

CROSS-REFERENCE TO RELATED APPLICATIONS

This application is the National Stage filing under 35 U.S.C. 371 of International Application No. PCT/KR2014/008797, filed on Sep. 22, 2014, which claims the benefit of earlier filing date and right of priority to Korean Application No. 10-2014-0112538, filed on Aug. 27, 2014, the contents of which are all hereby incorporated by reference herein in their entirety.

TECHNICAL FIELD

The present disclosure relates to a mobile terminal capable of outputting graphic objects thereon.

BACKGROUND ART

Terminals may be divided into mobile/portable terminals and stationary terminals according to their mobility. Also, the mobile terminals may be classified into handheld terminals and vehicle mount terminals according to whether or not a user can directly carry.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. Specifically, in recent time, mobile terminals can receive broadcast and multicast signals to allow viewing of video or television programs.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements.

Meanwhile, users of the terminals may suffer from inconvenience in using such diversified and complicated functions. Thus, in recent time, various techniques for providing the users with various functions in an easier convenient manner are under development.

The present invention is intended to provide various methods for improving users' convenience in use of mobile terminals.

DISCLOSURE OF THE INVENTION

Therefore, an aspect of the detailed description is to provide a method of viewing a specific image on a background screen which is output on a home screen page.

Another aspect of the detailed description is to provide a method of utilizing a region, on which a graphic object is not output on a home screen page.

To achieve these and other advantages and in accordance with the purpose of the present invention, as embodied and broadly described herein, there is provided a mobile terminal including a display unit that is configured to display a home screen page including a plurality of graphic objects, and a controller that is configured to output the plurality of graphic objects on the other region, except for a specific region, of the home screen page. Here, the plurality of graphic objects may be output on positions, decided based on a preset condition, on the other region.

In accordance with one exemplary embodiment disclosed herein, the home screen page may further include a background image that is output on a background of the home screen page. The controller may recognize a facial image of the background image using a face recognition function, and arrange the plurality of graphic objects on the other region, except for a face region with the facial image output, of a region of the home screen page.

In accordance with one exemplary embodiment disclosed herein, when it is determined that the other region except for the face region does not have an empty space to output the plurality of graphic objects, the controller may generate a group according to a preset condition and output a folder image indicating the group on the other region. Here, the group may include at least one graphic object of the plurality of graphic objects.

In accordance with one exemplary embodiment disclosed herein, the controller may detect a size of the other region, and decide a size of each of the plurality of graphic objects based on the size of the other region.

In accordance with one exemplary embodiment disclosed herein, the plurality of graphic objects may be arranged on the home screen page. The controller may move a graphic object of the plurality of graphic objects, which is arranged on the specific region, to the other region except for the specific region.

In accordance with one exemplary embodiment disclosed herein, the home screen page may be divided into at least two virtual regions based on a preset reference line. The controller may move a graphic object arranged on the specific region within one of the at least two virtual regions. Here, the one virtual region may include the graphic object arranged on the specific region.

In accordance with one exemplary embodiment disclosed herein, when it is impossible to move a graphic object within the one virtual region, the controller may move the graphic object arranged on the specific region to another virtual region, different from the one virtual region, according to a preset order.

In accordance with one exemplary embodiment disclosed herein, the controller may detect a size of each of the plurality of graphic objects. The controller may arrange the plurality of graphic objects by varying the sizes thereof according to a preset condition when moving the graphic object arranged on the specific region.

In accordance with one exemplary embodiment disclosed herein, the controller may arrange the plurality of graphic objects on the other region, except for the specific region, according to sizes of the plurality of graphic objects.

In accordance with one exemplary embodiment disclosed herein, a plurality of graphic objects may be output on the home screen page. The controller may set the specific region without the plurality of graphic objects output thereon, in response to a preset touch applied to the home screen page. The controller may change an output position of at least one graphic object, displayed on the specific region, of the plurality of graphic objects.

In accordance with one exemplary embodiment disclosed herein, the controller may output a guide image indicating the specific region around the specific region. The controller may change at least one of a size and a position of the specific region, in response to a drag input applied to the guide image.

In accordance with one exemplary embodiment disclosed herein, the home screen page may include a background image output on a background thereof, and the plurality of graphic objects. The mobile terminal may further include a memory that is configured to store history information indicating the background image and an arrangement state of the plurality of graphic objects on the background image. The controller may detect at least one image to be output on the background of the home screen page using the history information stored in the memory.

In accordance with one exemplary embodiment disclosed herein, the memory may store the history information indicating a plurality of background images and an arrangement state of graphic objects on each of the background images. When one of a plurality of history information stored in the memory is selected, the controller may output one of the plurality of background images on the home screen page as a background, and simultaneously arrange a plurality of graphic objects output on the home screen page on the basis of an arrangement state of graphic objects associated with the one background image.

In accordance with one exemplary embodiment disclosed herein, the specific region may be associated with a function relevant to an image output on the specific region. The controller may execute the function associated with the specific region, in response to a preset touch applied to the specific region.

In accordance with one exemplary embodiment disclosed herein, the specific region may be associated with at least two functions. The controller may output at least two graphic objects, indicating the at least two functions associated with the specific region, in the vicinity of the specific region, in response to a preset touch applied to the specific region.

In accordance with one exemplary embodiment disclosed herein, the controller may execute a function associated with one of the at least two graphic objects when the preset touch is sensed on the one graphic object.

To achieve these and other advantages and in accordance with the purpose of the present invention, as embodied and broadly described herein, there is provided a method of controlling a mobile terminal, the method including outputting a background image, as a background of a home screen page, on a display unit and arranging a plurality of graphic objects on the background image in an overlapping manner, setting a specific region, on which any graphic object is not output, of an output region of the home screen page, detecting at least one graphic object, output on the specific region, of the plurality of graphic objects, and controlling the display unit to output the detected at least one graphic object on the other region, except for the specific region, of the output region of the home screen page.

In accordance with one exemplary embodiment disclosed herein, the background image may include a facial image. A region on which the facial image of the background image is output may be set to the specific region using a face recognition function.

In accordance with one exemplary embodiment disclosed herein, the specific region may be associated with a function relevant to the facial image. The function relevant to the facial image may be executed in response to a preset touch applied to the specific region.

In accordance with one exemplary embodiment disclosed herein, when at least one graphic object output on the specific region is detected, the graphic object output on the specific region, of the plurality of graphic objects, may be output in a manner of being visually distinctive from the other graphic objects.

MODES FOR CARRYING OUT THE PREFERRED EMBODIMENTS

Figure 1A:
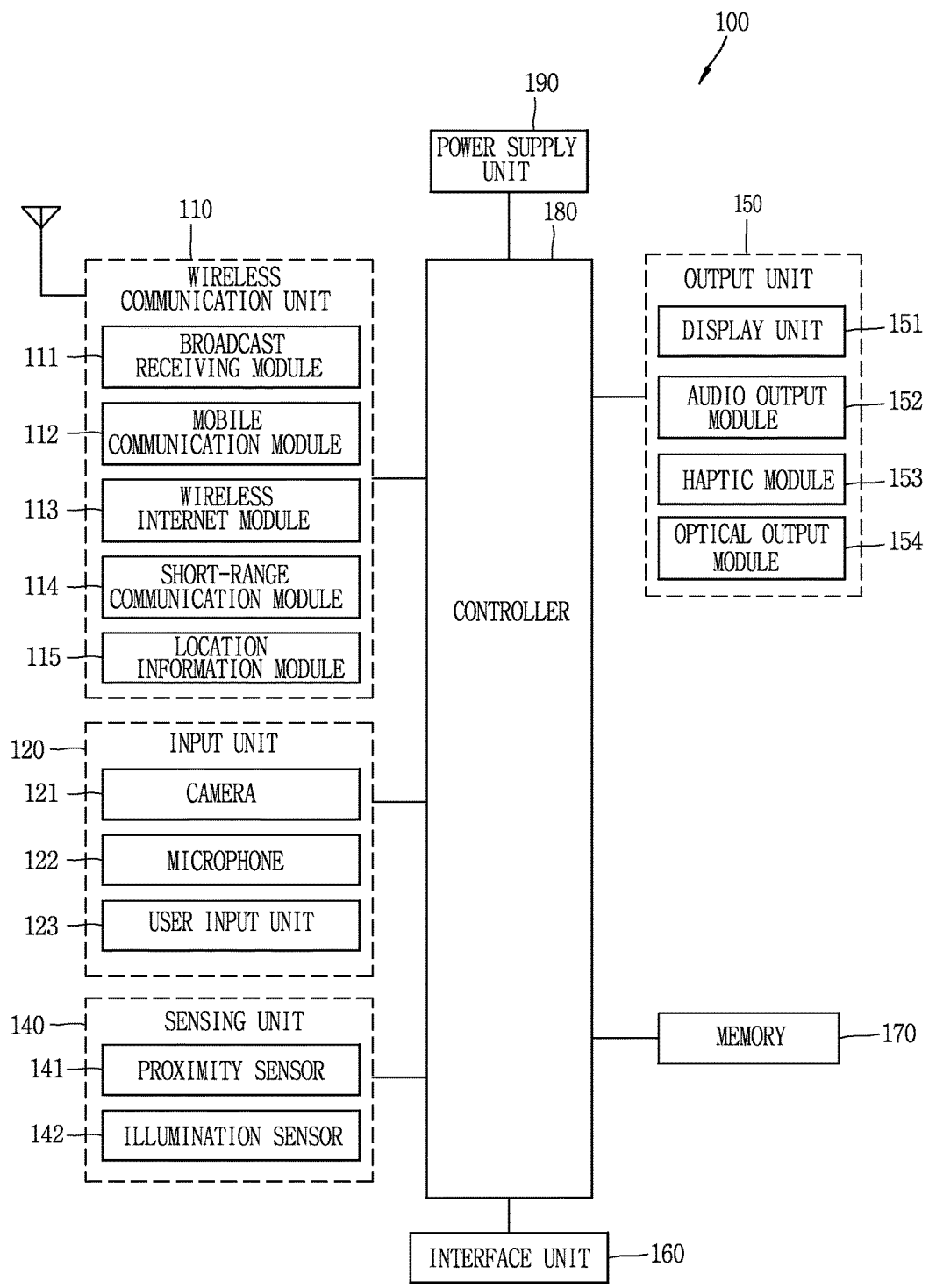
FIG. 1A is a block diagram of a mobile terminal in accordance with the present disclosure.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, moreover, the detailed description will be omitted when a specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several features, numbers, steps, operations, components, or combination thereof, disclosed in the specification, and it is also understood that greater or fewer features, numbers, steps, operations, components, or combination thereof may likewise be utilized.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
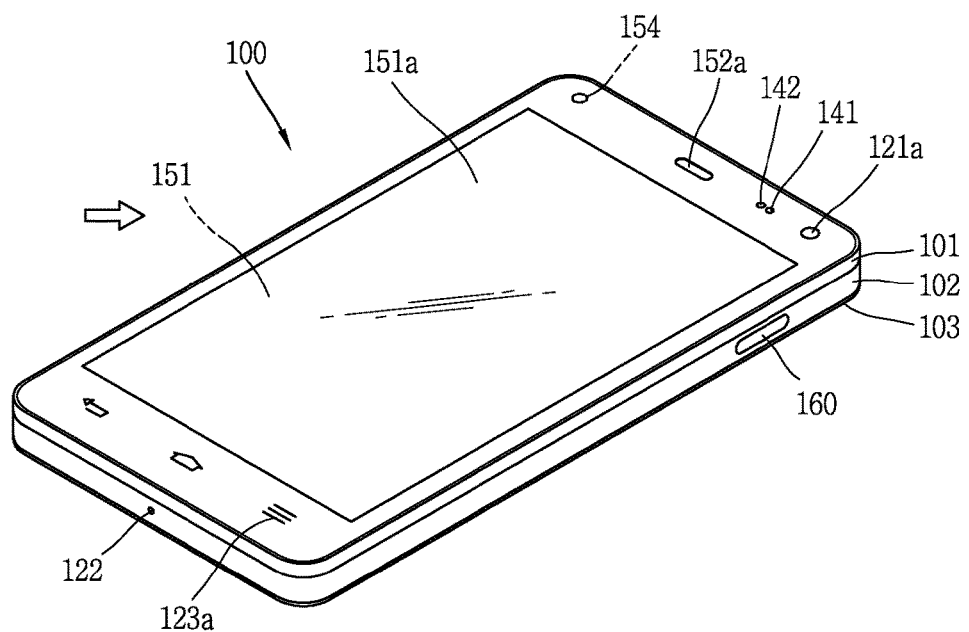
FIGS. 1B and 1C are conceptual views illustrating one example of the mobile terminal, viewed from different directions.
Figure 1C:
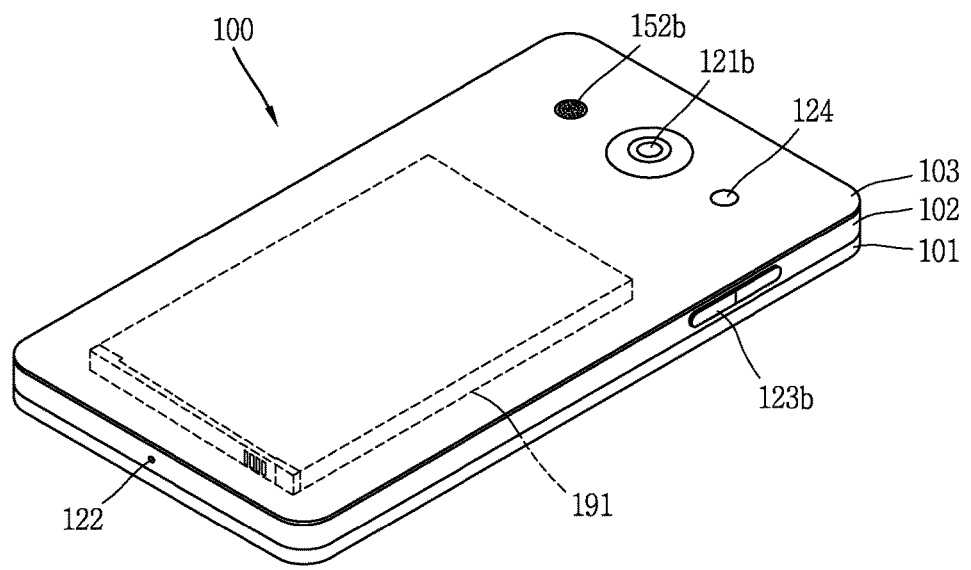

Reference is now made to FIGS. 1A to 1C, where FIG. 1A is a block diagram of a mobile terminal in accordance with the present disclosure, and FIGS. 1B and 1C are conceptual views of one example of the mobile terminal, viewed from different directions.

The mobile terminal 100 may be shown having components such as a wireless communication unit 110, an input unit 120, a sensing unit 140, an output unit 150, an interface unit 160, a memory 170, a controller 180, and a power supply unit 190. It may be understood that implementing all of the illustrated components is not a requirement, and that greater or fewer components may alternatively be implemented.

In more detail, the wireless communication unit 110 among those components may include one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 may include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115.

The input unit 120 may include a camera 121 or an image input unit for inputting an image signal, a microphone 122 or an audio input unit for inputting an audio signal, and a user input unit 123 (for example, a touch key, a push (or mechanical) key, and the like) for allowing a user to input information. Data (for example, audio, video, image, and the like) is obtained by the input unit 120 and may be analyzed and processed according to user commands.

The sensing unit 140 may be implemented using one or more sensors configured to sense internal information of the mobile terminal, the surrounding environment of the mobile terminal, user information, and the like. For example, the sensing unit 140 is shown having a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from at least two sensors of the sensing unit 140, and combinations thereof.

The output unit 150 may be configured to output various types of information, such as audio, video, tactile output, and the like. The output unit 150 may be shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170.

As one example, the controller 180 controls some or all of the components illustrated in FIG. 1A to execute an application program that have been stored in the memory 170. Also, the controller 180 may operate at least two components included in the mobile terminal in a combining manner to activate the application program.

The power supply unit 190 can be configured to receive external power or provide internal power, under the control of the controller, in order to supply appropriate power required for operating elements and components included in the mobile terminal 100. The power supply unit 190 may include a battery, and the battery may be configured to be embedded in the terminal body, or configured to be detachable from the terminal body.

At least some of those components may be combined for operation to implement an operation, a control or a control method of the mobile terminal according to various embodiments disclosed herein. Also, the operation, the control or the control method of the mobile terminal may be implemented on the mobile terminal by activating at least one application program stored in the memory 170.

Hereinafter, prior to describing various exemplary embodiments implemented by the mobile terminal 100, each of the aforementioned components will be described in more detail with reference to FIG. 1A.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. Two or more broadcast receiving modules may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), Enhanced Voice-Date Optimized or Enhanced Voice-Data Only (EV-DO), Wideband CDMA (WCDMA), High Speed Downlink Packet access (HSDPA), High Speed Uplink Packet Access (HSUPA), Long Term Evolution (LTE), LTE-advanced (LTE-A) and the like).

Examples of the wireless signals include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If necessary, the location information module 115 may perform a function of another module of the wireless communication unit 110, in order to obtain data associated with a location of the mobile terminal in a replacing manner or an additional manner. The location information module 115 is a module used for acquiring a location (or a current location) of the mobile terminal, and may not be limited to a module which directly calculates or acquires the location of the mobile terminal.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 processes an external audio signal into electric audio data. The processed audio data may be utilized in various manners according to a currently-executed function (or a currently-executed application program) in the mobile terminal 100. Meanwhile, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element or a mechanical key (for example, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch (or touch input) applied to the touch screen, such as the display unit 151, using any of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one of a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule alarm, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

As aforementioned, the controller 180 controls the operations associated with the application programs and typically controls the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch type, glasses-type, and the like). However, such teachings with regard to a particular type of mobile terminal will generally apply to other types of mobile terminals as well.

Here, considering the mobile terminal 100 as at least one set, the terminal body may be understood as a conception referring to the set.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 outputs information processed in the mobile terminal 100. For example, the display unit 151 may display execution screen information of an application program executing at the mobile terminal 100 or user interface (UI) and graphic user interface (GUI) information in response to the execution screen information.

The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver for transferring call sounds to a user's ear and the second audio output module 152b may be implemented in the form of a loud speaker to output alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule alarm, an email reception, information reception through an application, and the like. When a user has checked a generated event, the controller 180 can control the optical output module 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a push (or mechanical) key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

When the rear input unit is provided on the rear surface of the terminal body, a new type of user interface using this can be implemented. Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Hereinafter, description will be given of a communication system which is operable with the mobile terminal 100 according to the present invention.

A communication system which is operable with the variously described mobile terminals will now be described in more detail. Such a communication system may be configured to utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system.

A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are coupled to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs can be included in the CDMA wireless communication system.

Each base station may include one or more sectors, each sector having an omni-directional antenna or an antenna pointed in a particular direction radially away from the base station. Alternatively, each sector may include two or more different antennas. Each base station may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

Hereinafter, description will be given of exemplary embodiments related to control methods which can be practiced in the mobile terminal having such configuration, with reference to the accompanying drawings. It will be understood by those skilled in the art that the present invention can be specified into other specific forms without departing from the spirit and essential features of the present invention.

A home screen and objects included in (or output on) the home screen will first be described, and then a control method of the home screen and the included objects according to the present invention will be described.

Figure 2A:
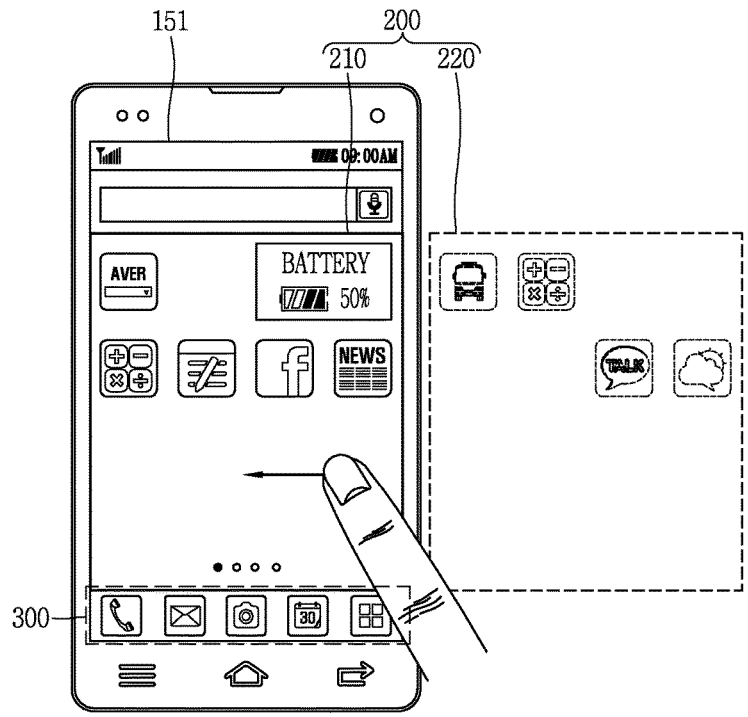
FIGS. 2A(a), 2A(b), 2B(a), 2B(b), 2C(a) and 2C(b) are conceptual views each illustrating a home screen page in a mobile terminal in accordance with the present invention.
Figure 2A:
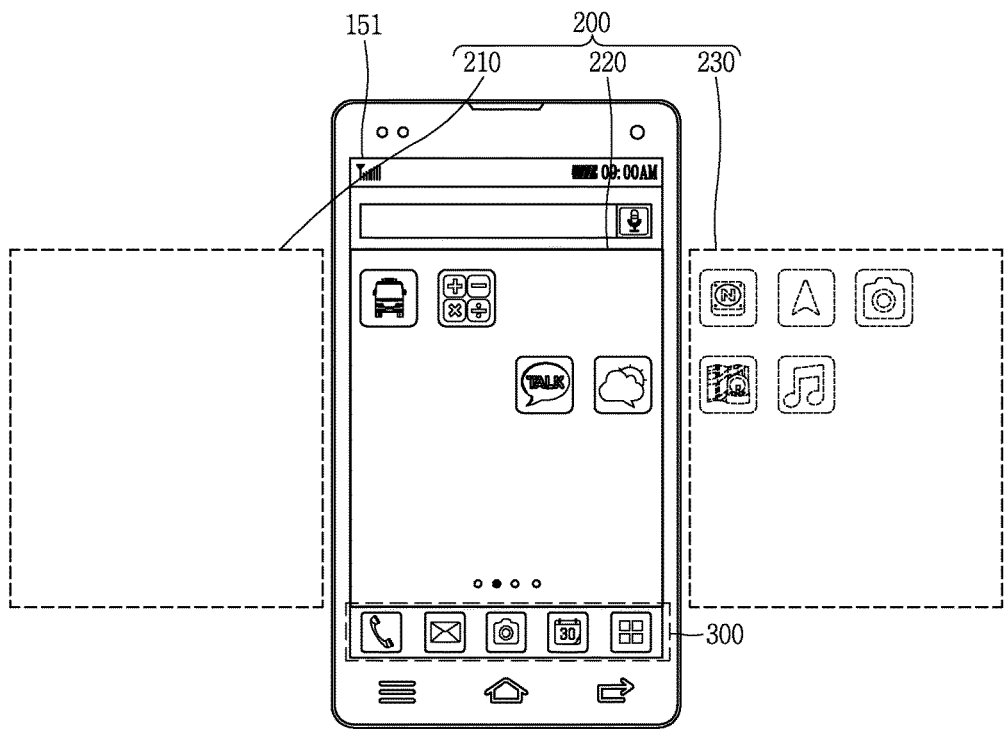
Figure 2B:
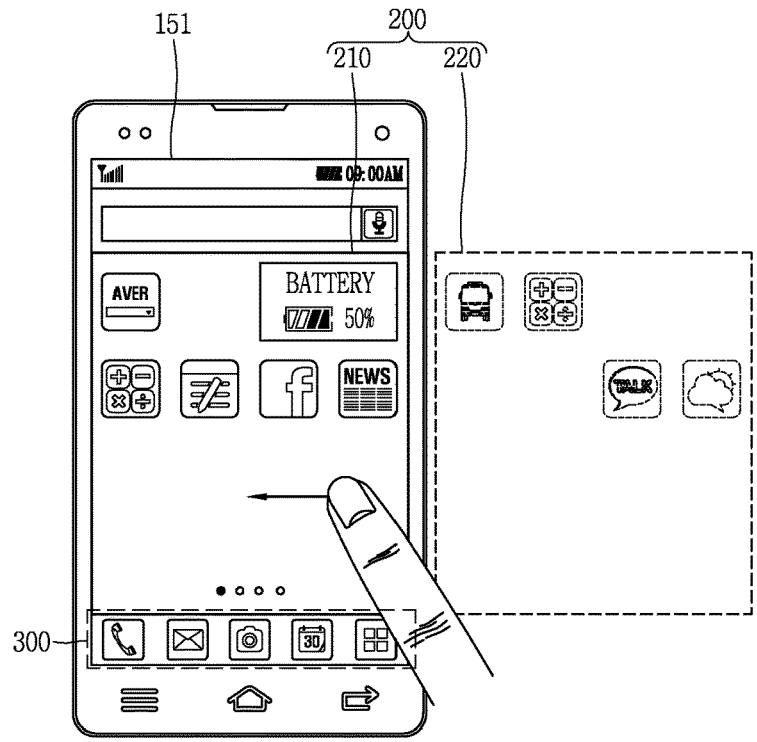
Figure 2B:
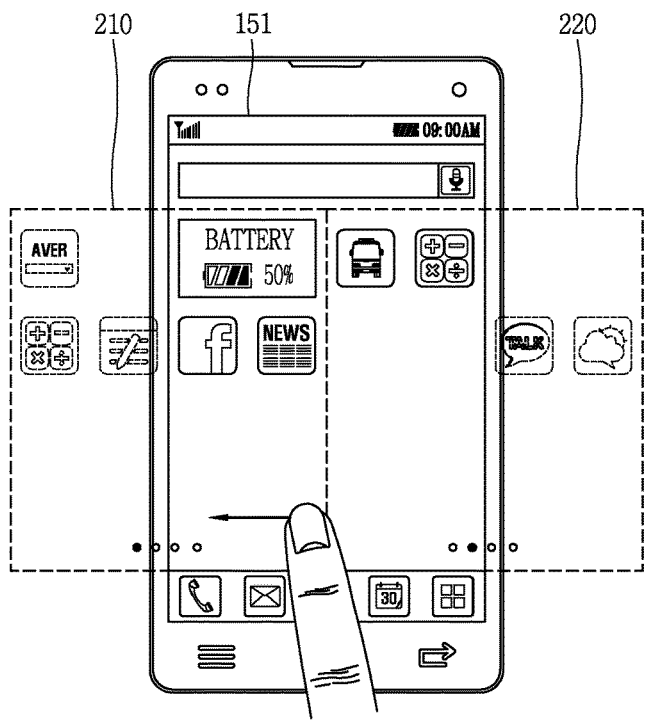
Figure 2C:
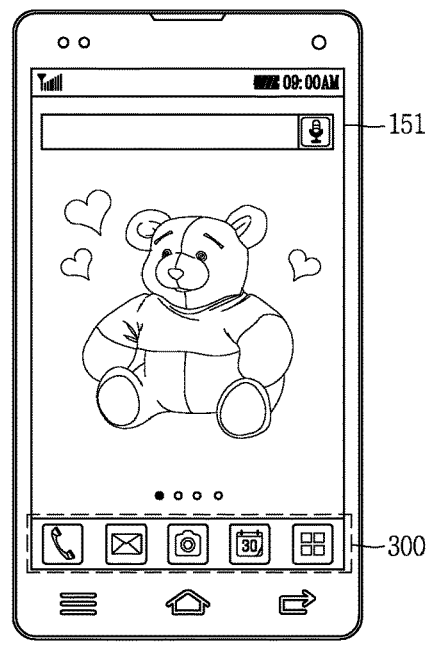
Figure 2C:
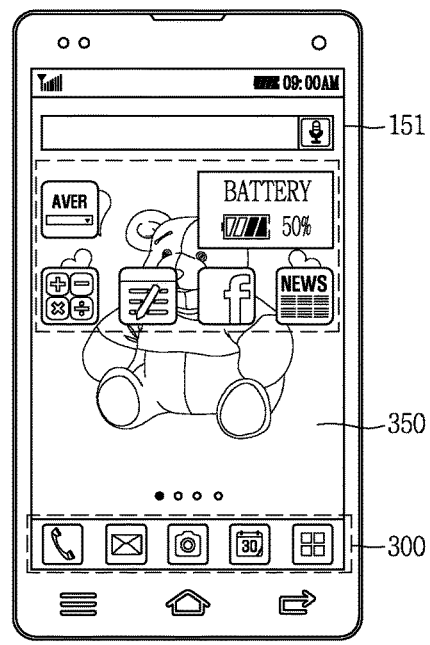

FIGS. 2A, 2B and 2C are conceptual views each illustrating a home screen page on a mobile terminal in accordance with the present invention.

A controller 180 (see FIG. 1) of a mobile terminal in accordance with one exemplary embodiment disclosed herein may output an idle screen, a home screen or a menu screen on a display unit. The idle screen, the home screen or the menu screen may include at least one graphic object, and the graphic object may be an icon associated with an application installed in the mobile terminal or a widget.

Here, the icon may indicate a function of executing an application associated with each icon. Also, the widget may indicate a function of providing brief information or function on a home screen without executing an application.

Whether or not to output the icon and the widget on the idle screen, the home screen or the menu screen may be decided by a user selection.

Meanwhile, the idle screen, the home screen or the menu screen, as illustrated in (a) of FIG. 2A, may include a plurality of home screen pages (or pages) 210 and 220 according to a user selection or the number of applications installed in the mobile terminal.

The idle screen, the home screen or the menu screen may include a home screen page 200, which outputs thereon an identification information region, which informs which of a plurality of home screen pages currently-output graphic objects belong to, and graphic objects. The idle screen, the home screen or the menu screen may further include a basic region 300 on which icons corresponding to specific applications preset by a user selection or the controller 180 are fixedly output.

The icons output on the basic region 300 may be continuously output on the basic region 300 even if a currently-output home screen page 210 is switched into another home screen page 220.

The following description will be given of "home screen page" which may include objects such as the icons and the widget, without separately discriminating the terms of the idle screen, the home screen or the menu screen.

The home screen page may have a size corresponding to the display unit 151 (see FIG. 1), and include a preset number of objects for facilitation of the user's recognition.

Also, a home screen page which is currently output on the display unit 151 may be switched into another home screen page, which is different from the currently-output home screen page, in response to a touch gesture applied by the user.

That is, the controller 180 may switch a first home screen page 210, which is currently output on the display unit 151 as illustrated in (a) of FIG. 2A, into a second home screen page 220 as illustrated in (b) of FIG. 2A, in response to a touch gesture applied onto the display unit 151.

Although not illustrated, in addition to the first and second home screen pages 210 and 220, more home screen pages such as third and fourth home screen pages may be output on the display unit 151. The number of home screen pages may be decided by a user selection or by the number of applications installed in the terminal.

As illustrated in (b) of FIG. 2B, the plurality of home screen pages 210 and 220 may simultaneously be output on the display unit 151 in response to the aforementioned touch gesture. One of the plurality of home screen pages may be output on the display unit 151 when the touch gesture is removed from the display unit 151.

The home screen page, as illustrated in (b) of FIG. 2B, may be displayed transparent such that edges and an area of the home screen page cannot be separated from the other screens output on the display unit.

That is, as illustrated in (b) of FIG. 2B, the controller 180 may display objects (the icons and the widget) included on the home screen pages, without a boundary surface between the home screen pages.

As illustrated in (a) and (b) of FIG. 2C, a background screen (or a background image) 350 may be output on the display unit 151 according to a user selection or a setting by the controller 180. The controller 180 may control the display unit 151 to output the background screen 350 and the home screen page 210 in an overlapping manner.

The controller 180 may control the display unit 151 to continuously output the background screen 350 when the home screen page 210 which is currently output on the display unit 151 is switched into another home screen page by a user selection. Also, the controller 180 may control the display unit 151 to output different background screens 350 with respect to a plurality of home screen pages, respectively.

In addition, the controller 180 may control transparency of the display unit 151 such that graphic objects output on a home screen page and the background screen 350 can be discriminated from each other. For example, objects (the icons and the widget) included in the home screen page may be opaquely output in a manner of overlapping the background screen 350 to facilitate the user's discrimination.

As described above, the home screen page may include the background screen 350 and the graphic objects, and the graphic objects may be output on the background screen 350 in the overlapping manner.

Hereinafter, description will be given with focus on the home screen page, but the present invention can also be applied to various embodiments such as a home screen, a lock screen, an idle screen of a cover and the like.

Figure 3:
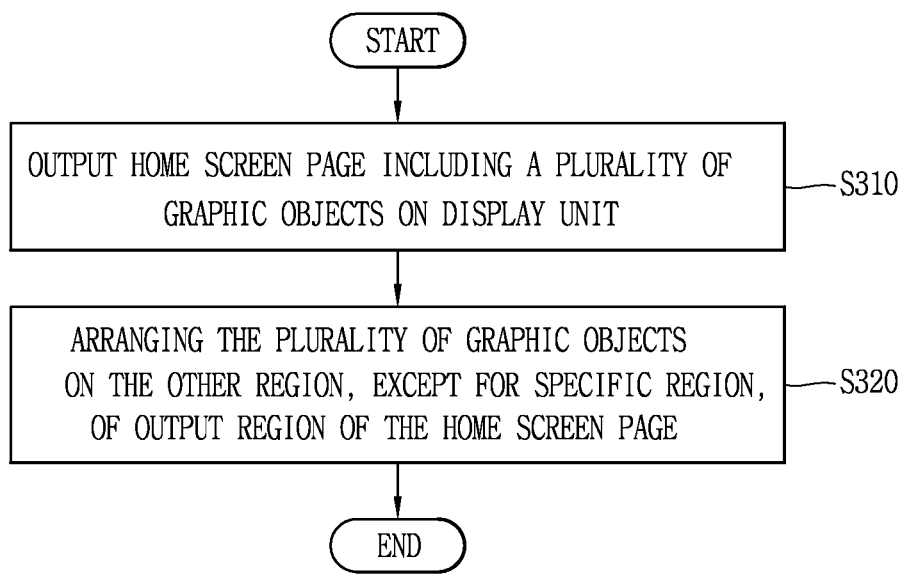
FIG. 3 is a flowchart illustrating a method of arranging graphic objects on a home screen page in a mobile terminal in accordance with one exemplary embodiment of the present invention.
Figure 4A:
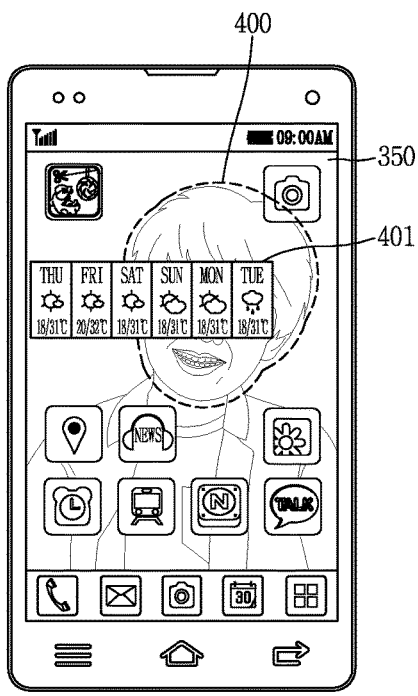
FIGS. 4A(a), 4A(b), 4B(a) and 4B(b) are conceptual views illustrating the control method of FIG. 3.
Figure 4A:
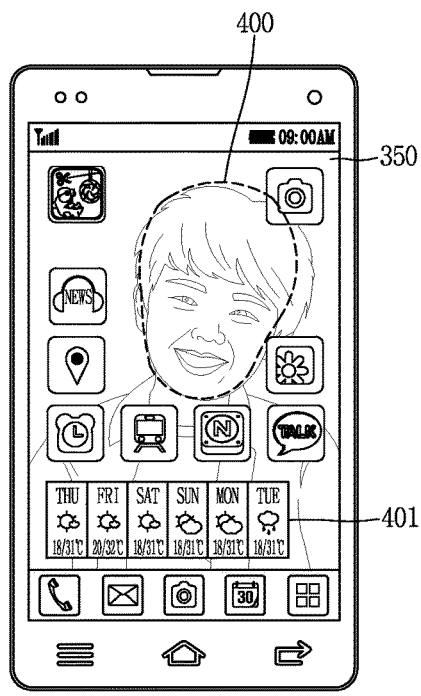
Figure 4B:
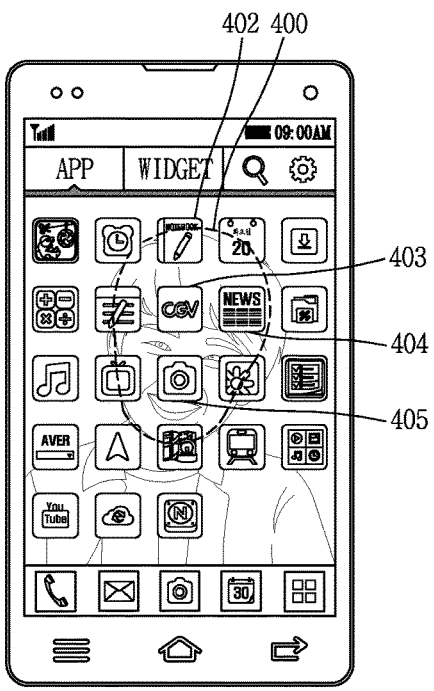
Figure 4B:
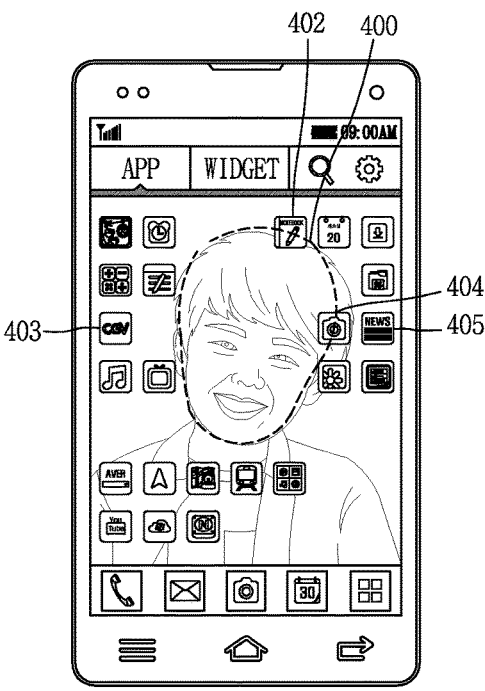

Hereinafter, description will be given of graphic objects and a background screen displayed on a home screen page in more detail, with reference to the accompanying drawings. FIG. 3 is a flowchart illustrating a method of arranging graphic objects on a home screen page in a mobile terminal in accordance with one exemplary embodiment of the present invention, and FIGS. 4A and 4B are conceptual views illustrating the control method of FIG. 3.

The present invention relates to a home screen page including a plurality of graphic objects on a display unit 151. While the plurality of graphic objects are arranged on the home screen page, the arrangement of the graphic objects can change. Also, the present invention can be applied to a case where positions of a plurality of graphic objects are also set when a home screen page is set.

Hereinafter, description will be given of a method of controlling a display unit not to output a plurality of graphic objects on a specific region while the plurality of graphic objects are output on a home screen page, but also be similarly applied to a case of setting positions to arrange graphic objects when setting a home screen page.

First of all, a mobile terminal in accordance with one exemplary embodiment disclosed herein may display a home screen page including a plurality of graphic objects on a display unit (S310).

A home screen page may be output on the display unit 151.

The home screen page may be divided into at least one virtual region having a preset unit size. Here, the virtual region refers to a region which is not displayed on the home screen page, namely, a reference region for arranging graphic objects. In more detail, the controller 180 may decide size and position of each graphic object based on the unit size.

For example, the home screen page may be divided into 20 regions each having a unit size corresponding to 5×4 matrix. Here, the size of each region may be the same or different.

Also, the number of virtual regions may be preset or set by a user. The unit size of the virtual region may vary according to the number of virtual regions. For example, when the home screen page is set to be divided into 12 regions corresponding to 4×3 matrix, the controller 180 may control the display unit 151 to change the unit size and the number of the virtual regions.

The home screen page may also output a background screen 350 and a plurality of graphic objects. Here, the plurality of graphic objects may be icons associated with applications installed in the mobile terminal or a widget.

Whether or not to include the plurality of graphic objects on the home screen page may be decided by a user. For example, the controller 180 may control some of icons selected by the user from icons, which are associated with a plurality of applications installed in the mobile terminal, to be included on the home screen page. Here, that the icons are included on the home screen page may refer to that icons are output on the home screen page.

Meanwhile, the plurality of graphic objects may be output on the home screen page in different sizes from one another. Here, the size of each graphic object may be preset or set by a user.

For example, when a preset touch (or a preset type of touch) is applied to a graphic object output on the home screen page, the controller 180 may change a size of the touch-applied graphic object. In more detail, when a long touch is applied to a graphic object output on the home screen page, the controller 180 may execute a function of changing the size of the graphic object. Here, the controller 180 may change the size of the graphic object into a size corresponding to a moving length of a drag input applied to an edge of the graphic object.

The plurality of graphic objects output on the home screen page may be arranged on the home screen page according to a user selection or a preset condition.

Here, the positions of the plurality of graphic objects arranged on the home screen page may be based on the virtual regions. In more detail, the controller 180 may arrange the plurality of graphic objects to correspond to a size of at least one of a plurality of virtual regions. That is, the controller 180 may arrange the plurality of graphic objects on positions which are set based on the virtual region.

Meanwhile, the mobile terminal in accordance with the one exemplary embodiment of the present invention may then control the display unit 151 to arrange the plurality of graphic objects on the other region, except for the specific region, of the output region of the home screen page (S320).

Upon arranging the plurality of graphic objects on the home screen page in the mobile terminal according to the one exemplary embodiment disclosed herein, the plurality of graphic objects may be arranged on the other region, except for the specific region, of the output region of the home screen page.

Here, the specific region is a region where any of the plurality of graphic objects is not arranged on the home screen page, namely, may be referred to as a non-arrangement region.

The specific region may be set based on a preset condition or according to a user selection. The preset condition may be related to a background screen output on the home screen page. For example, when the background screen includes a facial image, the preset condition may be a condition that a region with the facial image output thereon is set to the specific region. As another example, when the background screen is a landscape image, the preset condition may be a condition that a region on which a specific figure is output in the landscape is set to the specific region.

As another example, the controller 180 may set the specific region in response to a preset touch applied to the background screen. For example, the controller 180 may set a touch-sensed region of an output region of the background screen to the specific region.

The specific region may have variable size and position. In more detail, the controller 180 may change at least one of the size and the position of the specific region on the basis of a preset touch applied to the specific region.

For example, when a touch having the same pattern as a preset pattern is sensed on the specific region, the controller 180 may perform a function of changing at least one of the size and the position of the specific region. Here, the controller 180 may change the at least one of the size and the position in response to a drag input applied to the specific region. When the size and the position of the specific region change, the controller 180 may also rearrange the plurality of graphic objects output on the home screen page such that the graphic objects are not output on the specific region.

Also, functions executable on the mobile terminal may be associated with (or linked to) the specific region where any of the graphic objects located on the home screen page is not output. For example, when a facial image of a particular person is output on the specific region, the controller 180 may recognize the person's face and associate information related to the recognized face with the specific region. In more detail, the face-related information may be phone number information, email information, a photo and the like, which are pre-stored in the memory 170 of the mobile terminal. In addition, when any information has not been stored in the memory 170, the face-related information may be information that a user directly inputs.

When a function is associated with the specific region, the controller 180 may execute the function in response to a preset touch applied to the specific region. Here, the preset touch may be a double touch, a touch with a specific pattern, and the like, and may freely be set by the user.

Meanwhile, when the specific region is set in the mobile terminal according to the one exemplary embodiment disclosed herein, the plurality of graphic objects may be arranged on the other region except for the specific region. Here, the controller 180 may arrange the plurality of graphic objects on the basis of a preset condition. The preset condition may be set by the user or preset upon initial production of the mobile terminal.

The preset condition may be a usage frequency of an application associated with a graphic object, a type of an application associated with a graphic object, a size of a graphic object and the like. For example, the controller 180 may arrange a graphic object with a smaller size on an upper portion of the display unit 151 and a graphic object with a greater size on a lower portion of the display unit 151 upon arranging the graphic objects on the other region of the home screen page.

Upon the specific region being set, even when additional graphic objects (for example, icons) are needed to be output on the home screen page, the mobile terminal according to the one exemplary embodiment disclosed herein may arrange the additional graphic objects (for example, the icons) on the other region, except for the specific region, of the home screen page.

Meanwhile, the number of graphic objects to be arranged on the other region may be limited. That is, since the number of the aforementioned virtual regions is limited on the other region, the number of graphic objects which are to be arranged on the other region may be limited based on the virtual regions.

Accordingly, when the plurality of graphic objects included on the home screen page are not all displayed on the other region, the controller 180 may change sizes of at least some of the plurality of graphic objects or move at least some of the plurality of graphic objects onto another home screen page which is different from the current home screen page.

Here, when the sizes of the at least some graphic objects change, the controller 180 may adjust a unit size of the virtual region into a size corresponding to the changed sizes of the graphic objects. In addition, the controller 180 may adjust the unit size of the virtual region so as to adjust the number of graphic objects to be output on the home screen page.

The foregoing description has been given of the method of arranging the graphic objects on the home screen page, but the present invention may not be limited to this. The present invention may also be applied under a situation that screen information output on the display unit 151 is obscured by graphic objects which are output along with the screen information. In more detail, the present invention may be applied under various situations, such as when graphic objects are output on a lock screen indicating a lock state of the mobile terminal, a case where a popup window is output on the display unit so as to obscure another screen information, and the like.

Hereinafter, the control method will be described in more detail with reference to the accompanying drawings.

As illustrated in (a) of FIG. 4A, the controller 180 may control the display unit 151 to output a home screen page which includes a background screen 350 and a plurality of graphic objects.

Here, the controller 180 may set a specific region 400, on which the plurality of graphic objects are not to be output, of an output region of the home screen page. For example, as illustrated in (a) of FIG. 4A, when a facial image is output on the background screen 350, the controller 180 may set a face region with the facial image thereon to the specific region 400 on which the plurality of graphic objects are not to be output.

When the specific region is set on the home screen page, the controller 180 may arrange the plurality of graphic objects on the other region, except for the specific region 400.

Here, the controller 180 may decide arrangement positions of the plurality of graphic objects according to a preset reference. For example, as illustrated in (b) of FIG. 4A, the controller 180 may sequentially arrange the plurality of graphic objects based on sizes thereof, starting from a graphic object with the smallest size, from top to bottom of the display unit 151. Here, the controller 180 may control the display unit 151 not to arrange the plurality of graphic objects on the specific region 400.

In more detail, as illustrated in (a) of FIG. 4A, one graphic object (or a widget) 401 may be output on the specific region 400. Here, the controller 180 may move the one graphic object 401, which is currently output on the specific region 400, to the other region of the home screen page such that the one graphic object 401 cannot be output on the specific region 400.

Here, the controller 180 may move the one graphic object 401 by considering the size of the graphic object 401. For example, when the one graphic object 401 has a size greater than the other graphic objects output on the home screen page, the controller 180 may move the one graphic object 401 onto a lower portion of the other region of the home screen page. For example, as illustrated in (b) of FIG. 4A, the controller 180 may move the graphic object 401 output on the specific region 400 onto the lower portion of the other region of the home screen page. This may allow the user to view the background screen 350 output on the specific region 400 without visual interference with a graphic object.

The controller 180 may also move the other graphic objects which are not output on the specific region 400, as well as the one graphic object 401. More specifically, when the one graphic object 401 output on the specific region 401 is moved to one region of the display unit 151, other graphic objects output on the one region may be moved to another region which is different from the one region on the remaining region of the display unit 151. Even in this instance, the other graphic objects may be moved within the other region, except for the specific region 400, of the home screen page.

That is, a plurality of graphic objects included on a home screen page may generally be rearranged while a graphic object output on a specific region is moved to the other region of the home screen page. This may allow for setting a region with graphic objects output thereon and a region without a graphic object output thereon.

Meanwhile, when there is no display space for graphic objects, which are output on the specific region 400, on the remaining region of the home screen page, the mobile terminal according to the one embodiment disclosed herein may change sizes of at least some of the plurality of graphic objects.

Here, the controller 180 may also change the unit size of the virtual region of the home screen page to correspond to the change in the size of the graphic object. Here, when the unit size of the virtual region changes, the number of graphic objects to be outputtable on the home screen page may also increase. More specifically, when the unit size of the virtual region decreases, the number of graphic objects to be outputtable on the home screen page may increase.

For example, as illustrated in (a) of FIG. 4B, the controller 180 may detect that there is not any empty space, to which graphic objects 402, 403, 404 and 405 output on the specific region are to be moved, on the remaining region of the home screen page, except for the specific region 400. Here, the specific region 400 may be a region, on which a facial image is output, of the background screen 350 output on the home screen page.

In this instance, the controller 180 may change sizes of at least some of the plurality of graphic objects, to generate an empty space. For example, as illustrated in (b) of FIG. 4B, the controller 180 may reduce sizes of all or at least some of the plurality of graphic objects. Here, by changing the sizes of the graphic objects, the controller 180 may generate an empty space within the remaining region of the home screen page such that the graphic object output on the specific region 400 can be moved onto the generated empty space.

When the empty space is generated, as illustrated in (b) of FIG. 4B, the controller 180 may arrange the graphic objects 402, 403, 404 and 405 output on the specific region 400 onto the empty space.

That is, according to the present invention, a region where any of a plurality of graphic objects is not to be arranged may be set in arranging the plurality of graphic objects included on the home screen page. To this end, the sizes and arrangement positions of the graphic objects can change. This may result in solving a problem that the background screen is obscured due to a complicated icon arrangement on the home screen page.

Figure 5A:
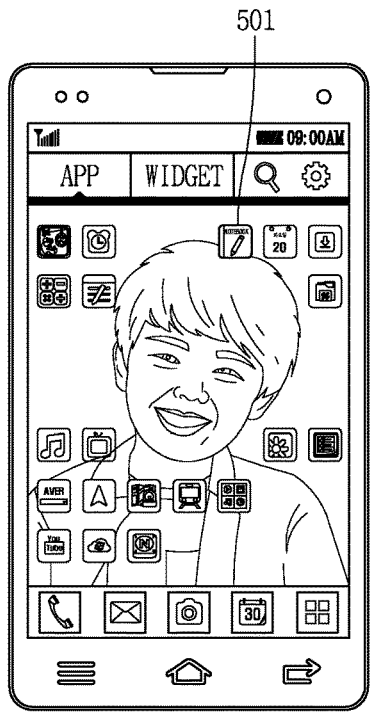
FIGS. 5A(a), 5A(b), 5A(c), 5B(a), 5B(b), 5B(c), 5B(d), 5C(a), 5C(b), 5C(c) and 5C(d) are conceptual views illustrating a method of setting a specific region, on which a graphic object is not to be arranged, of an output region of a home screen page.
Figure 5A:
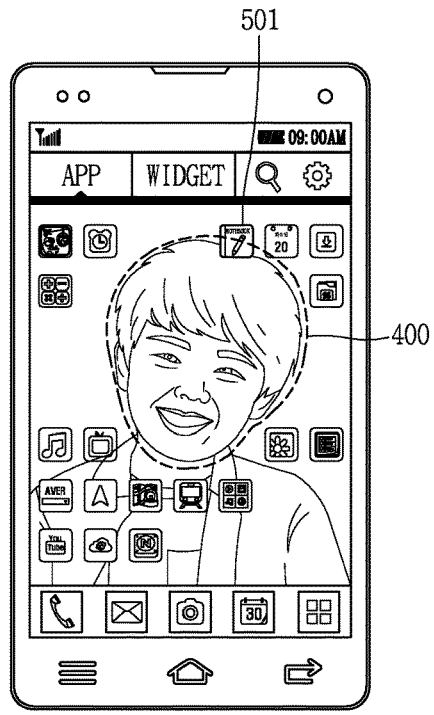
Figure 5A:
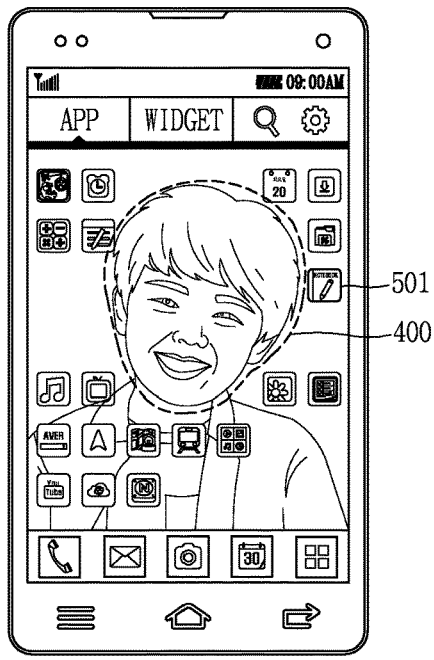
Figure 5B:
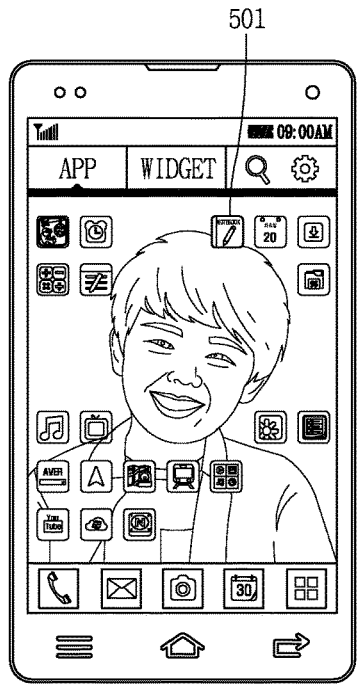
Figure 5B:
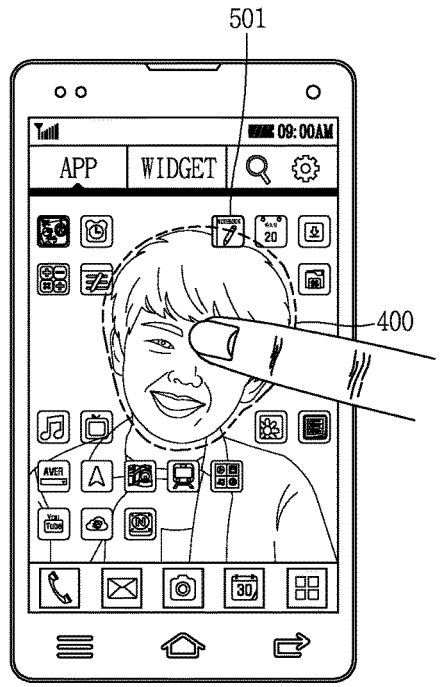
Figure 5B:
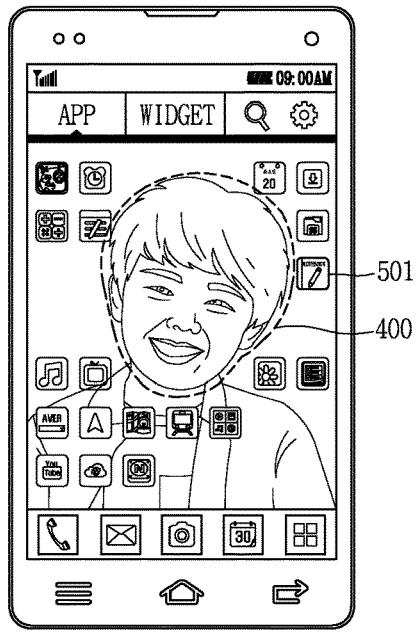
Figure 5B:
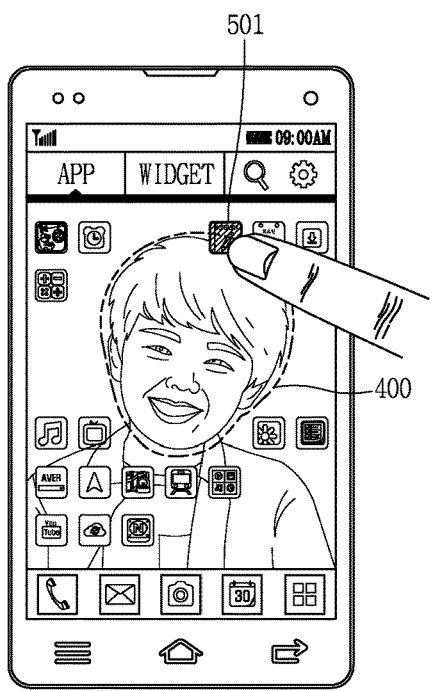
Figure 5C:
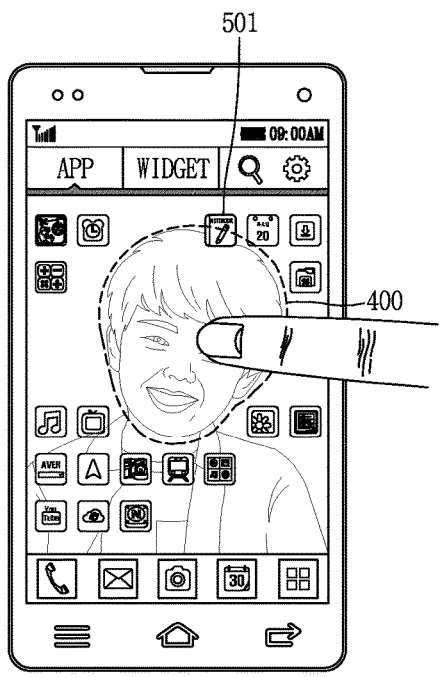
Figure 5C:
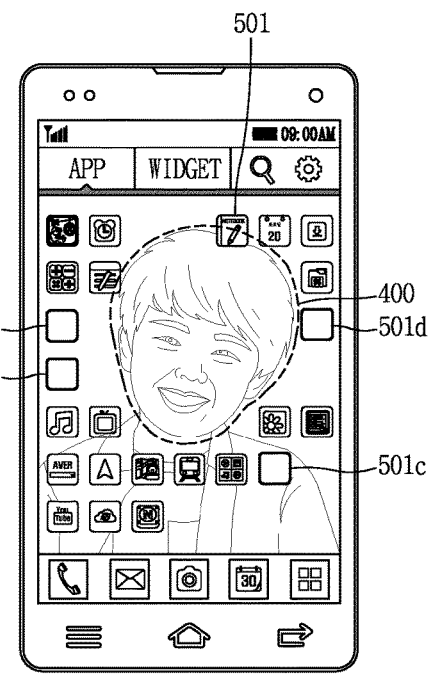
Figure 5C:
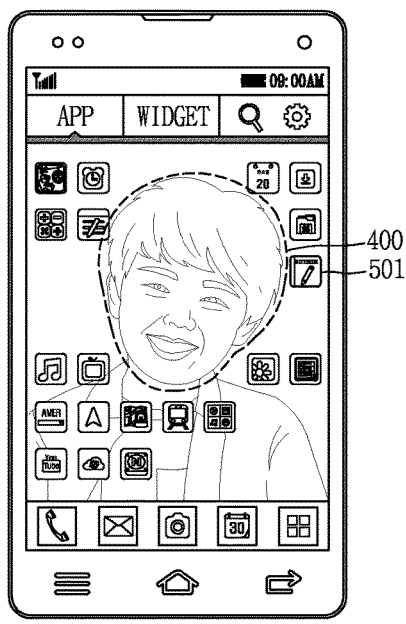
Figure 5C:
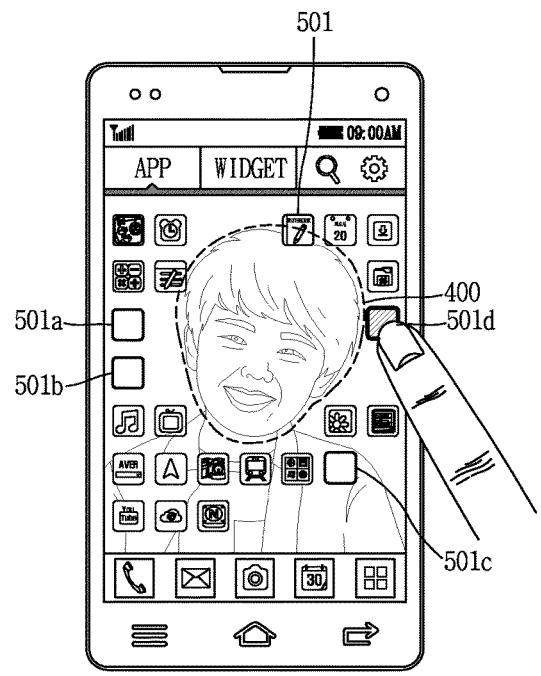

The foregoing description has been given of the method of controlling the display unit not to output graphic objects on the specific region of the home screen page. Hereinafter, a method of setting a specific region on which the graphic object is not arranged will be described with reference to the accompanying drawings. FIGS. 5A to 5C are conceptual views illustrating a method of setting a specific region, on which a graphic object is not to be arranged, of an output region of a home screen page.

The present invention may automatically set or set by a user a specific region 400, on which a graphic object is not to be arranged, of the output region of the home screen page.

In more detail, the present invention can set a region, which meets a preset condition, of the output region of the home screen page to the specific region 400 on which a graphic object is not to be output.

Here, the preset condition may be a condition of detecting a region with a specific image output thereon through image recognition with respect to a background screen 350 output on the home screen page. For example, as illustrated in (a) of FIG. 5A, the controller 180 may detect as the specific region 400 a face region, on which a facial image is output, of the background screen 350. Here, as illustrated in (b) of FIG. 5A, the controller 180 may also output a guide image, which indicates that the face region with the facial image output thereon is the specific region 400.

Here, the controller 180 may change at least one of a size and a position of the specific region 400 in response to a touch applied to the guide image. For example, the controller 180 may increase or decrease the size of the specific region 400 in response to a drag input applied to an edge region of the guide image. As another example, the controller 180 may change the position of the specific region 400 in a direction corresponding to a moving direction of a drag input, in response to the drag input applied to a central region of the guide image.

Afterwards, the controller 180 may detect at least one graphic object which is output with overlapping at least part of the face region with the facial image output thereon. For example, as illustrated in (a) and (b) of FIG. 5A, one graphic object 501 of the plurality of graphic objects included on the home screen page may be output on the specific region 400 in a manner of overlapping the facial image.

Here, the controller 180 may control the display unit 151 to output the one graphic object 501, which is currently output on the specific region 400, on the other region, except for the specific region 400, of the home screen page. For example, as illustrated in (c) of FIG. 5A, the controller 180 may output the one graphic object 501 on the other region of the home screen page. This may allow the user to view the home screen page in the state that the graphic objects included on the home screen page are arranged without obscuring the facial image output on the background screen 350.

Also, the present invention may set the specific region on which a graphic object is not to be arranged according to a user selection. For example, as illustrated in (b) of FIG. 5B, the controller 180 may detect a region to which a touch with a preset area or more is applied to the home screen page. The touch with the preset area or more may refer to a touch whose touch area from a start time point that the touch is sensed to an end time point that the touch is not sensed, is more than the preset area.

Here, the controller 180 may set a region, to which the touch with the preset area or more is applied, of the output region of the home screen page to the specific region 400 without outputting a graphic object thereon. Afterwards, as illustrated in (c) of FIG. 5B, the controller 180 may output the guide image indicating the specific region 400. Also, as illustrated in (d) of FIG. 5B, the controller 180 may control the display unit 151 to output the graphic object 501, which is currently output on the set specific region 400, on the other region of the home screen page except for the specific region 400.

Meanwhile, when the graphic object 501 output on the specific region 400 is moved to the other region except for the specific region, the controller 180 may provide a user interface for the user to select a region or portion, on which the one graphic object 501 is to be output, of the other region. In more detail, as illustrated in (b) of FIG. 5C, the controller 180 may output a plurality of guide images 501*a*, 501*b*, 501*c* and 501*d* each indicating an expected output region, on which the one graphic object 501 is to be output on the other region, on at least part of the other region.

Here, when a touch applied to one 501*d* of the plurality of guide images 501*a*, 501*b*, 501*c* and 501*d* is sensed, the controller 180 may output the one graphic object 501 on a region corresponding to the touch-sensed image 501*d*. For example, as illustrated in (c) and (d) of FIG. 5C, the controller 180 may output the one graphic object 501 on a region corresponding to the touch-sensed one image 501*d* of the plurality of guide images 501*a*, 501*b*, 501*c* and 501*d*.

The foregoing description has been given of the method of setting the specific region without a graphic object output thereon of the output region of the home screen page. This may allow the user to be provided with a screen on which an image output on the specific region of the background screen 350 output on the home screen page is not obscured.

Hereinafter, a method of outputting a plurality of graphic objects in a grouping manner will be described in more detail. FIGS. 6A to 6D are conceptual views illustrating a method of outputting a plurality of graphic objects in a grouping manner.

The present invention can control the display unit 151 not to output a plurality of graphic objects, which are included on the home screen page, on a specific region of the output region of the home screen page. Here, when there is a graphic object output on the specific region, the controller 180 may control the display unit 151 to output the graphic object, which is currently output on the specific region, onto the other region except for the specific region.

When it is determined that the other region does not have an empty space to output the graphic object output on the specific region, the controller 180 may group at least some of the plurality of graphic objects included on the home screen page and output the grouped graphic objects on one region of the home screen page. Here, the grouping may refer to that the at least some graphic objects are displayed using one folder image, and the display unit 151 is controlled to output the at least some graphic objects when the folder image is selected. For example, as illustrated in (a), (b) and (c) of FIG. 6A, the controller 180 may indicate at least some graphic objects 601, 602, 603 and 604 using one folder image 610.

Here, the controller 180 may detect the at least some graphic objects 601, 602, 603 and 604 from the plurality of graphic objects, according to a preset reference or a user selection. Here, the preset reference may be function similarities, usage frequencies, the same or similar manufacturer or developer or the like, with respect to applications indicated by the graphic objects.

After detecting the at least some graphic objects 601, 602, 603 and 604, the controller 180 may group the at least some graphic objects 601, 602, 603 and 604 and notify the grouping by outputting a folder image on the display unit 151. Here, as illustrated in (c) of FIG. 6A, the controller 180 may output the folder image and the other graphic objects, except for the at least some graphic objects 601, 602, 603 and 604 of the plurality of graphic objects, on the other region except for the specific region without the graphic object output thereon.

The controller 180 may also group the at least some graphic objects 601, 602, 603 and 604 of the plurality of graphic objects, in response to a preset touch applied to the home screen page.

In more detail, after setting the specific region 400, when the other region except for the specific region 400 does not have an empty space to move thereto the graphic object output on the specific region 400, the controller 180 may output screen information for the user to select at least some graphic objects to group from the plurality of graphic objects. For example, as illustrated in (b) and (c) of FIG. 6B, the controller 180 may output screen information for selecting at least some of the plurality of graphic objects. Here, according to the present invention, at least some graphic objects 601, 602, 603 and 604, which are included in a closed loop generated by a touch, of the plurality of graphic objects may be sensed. Afterwards, the controller 180 may group the at least some graphic objects 601, 602, 603 and 604 and indicate the grouped at least some graphic objects 601, 602, 603 and 604 using the one folder image 610.

Accordingly, the respective regions occupied by the at least some graphic objects 601, 602, 603 and 604 can be reduced into one region.

Figure 6A:
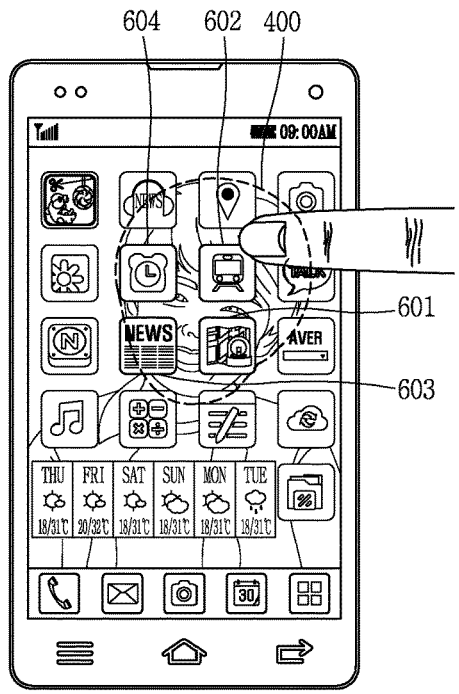
FIGS. 6A(a), 6A(b), 6A(c), 6B(a), 6B(b), 6B(c), 6B(d), 6C(a), 6C(b), 6C(c), 6D(a), 6D(b), 6D(c) and 6D(d) are conceptual views illustrating a method of outputting a plurality of graphic objects in a grouping manner.
Figure 6A:
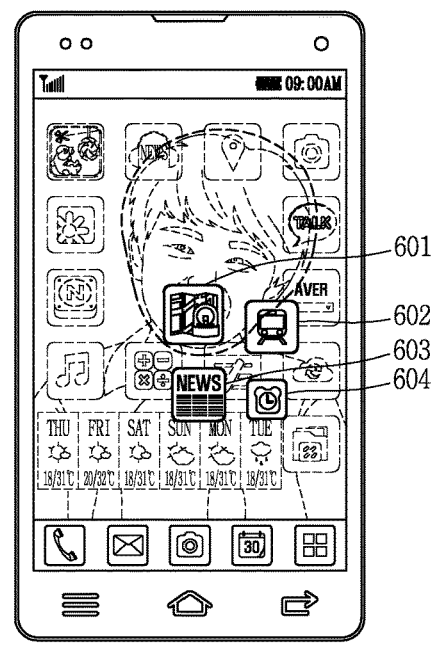
Figure 6A:
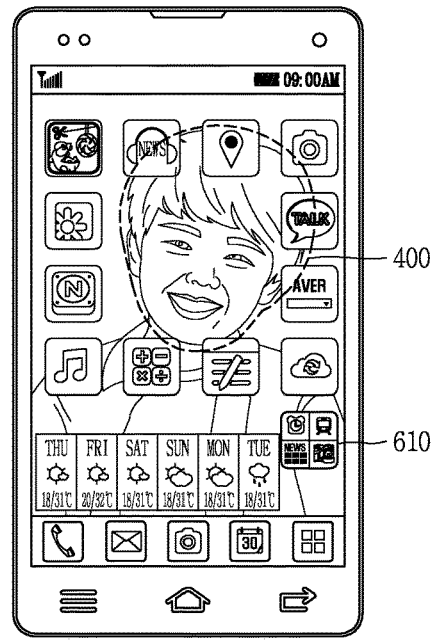
Figure 6B:
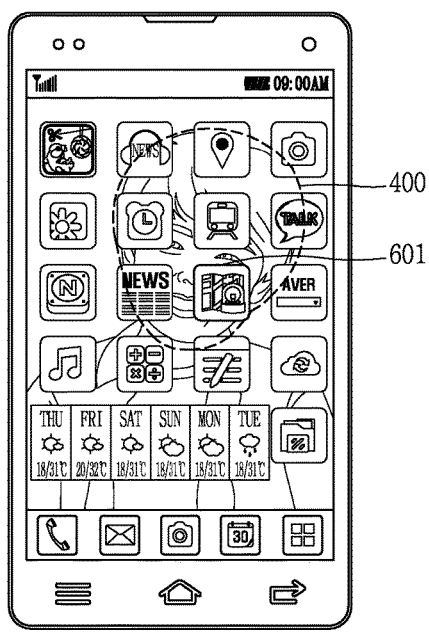
Figure 6B:
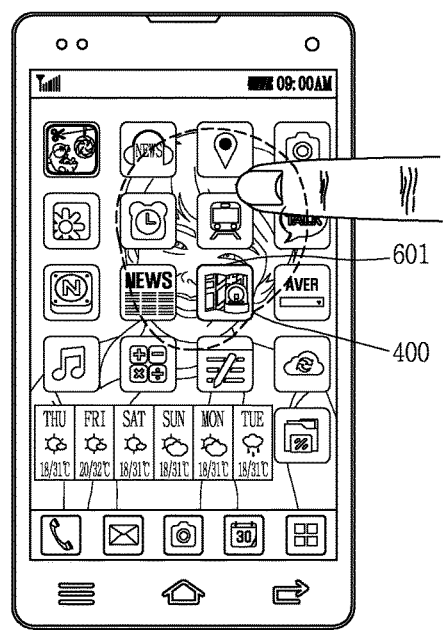
Figure 6B:
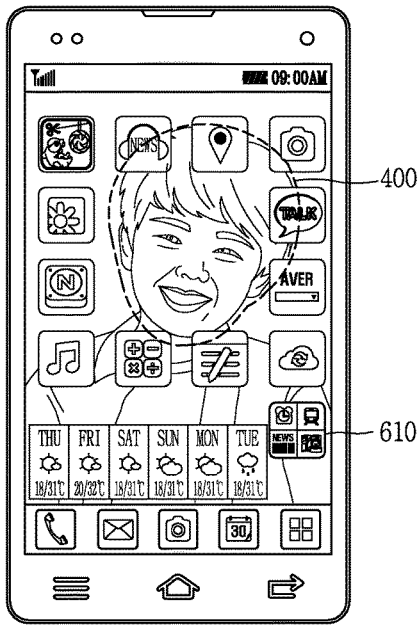
Figure 6B:
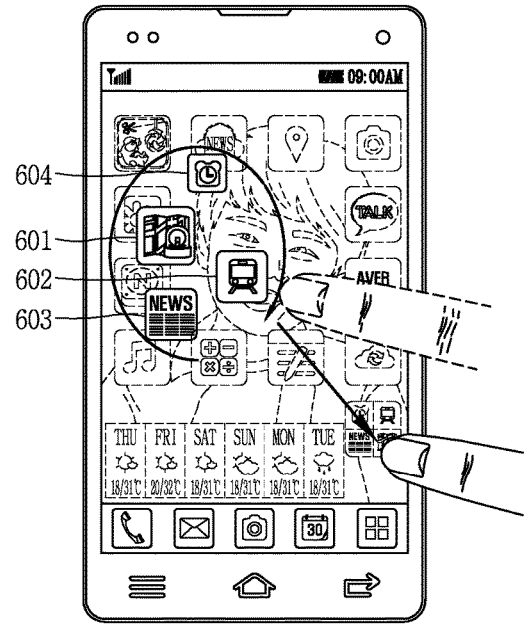

Afterwards, as illustrated in (d) of FIG. 6B, the controller 180 may rearrange the folder image including the at least some graphic objects and the other graphic objects on the other region except for the specific region 400.

Meanwhile, when the at least some graphic objects 601, 602, 603 and 604 are grouped into the folder image 610, the controller 180 may output the at least some graphic objects 601, 602, 603 and 604 on the display unit 151 through a touch applied to the folder image 610.

In this instance, the controller 180 may output the graphic objects grouped in the folder image 610 on a popup window 620 in response to a touch applied to the folder image 610. Also, even when the graphic objects grouped in the folder image 610 are output on the popup window 620, the controller 180 may control the display unit 151 to output the popup window 620 on the other region except for the specific region 400.

In more detail, the controller 180 may change at least one of a position, a size and transparency of the popup window 620 such that the popup window 620 cannot overlap the specific region. For example, as illustrated in (a) and (b) of FIG. 6C, the controller 180 may control an output position of the popup window 620, which includes the at least some graphic objects 601, 602, 603 and 604 grouped in the folder image 610, such that the popup window 620 can be output on the other region except for the specific region 400.

Figure 6C:
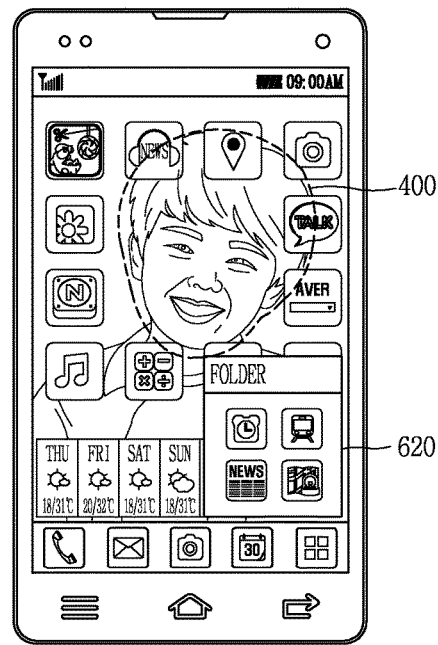
Figure 6C:
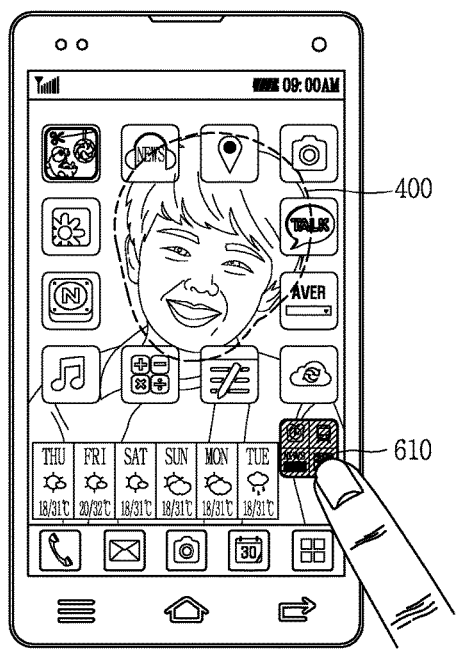
Figure 6C:
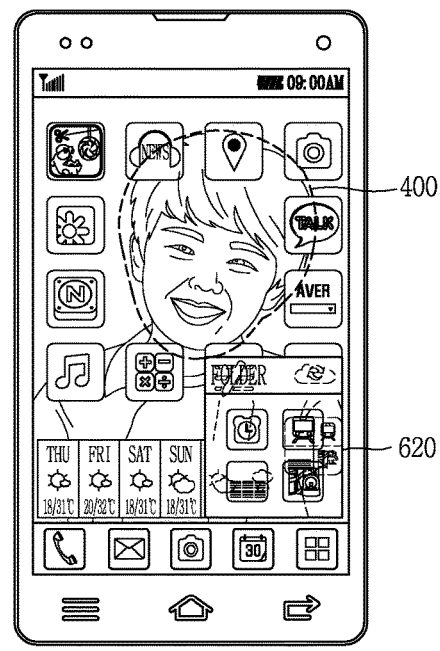
Figure 6D:
Figure 6D:
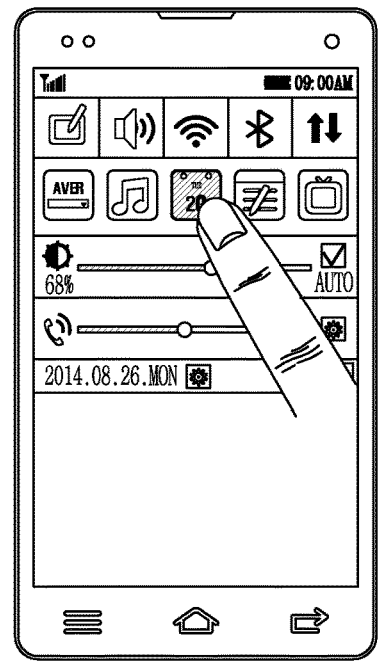
Figure 6D:
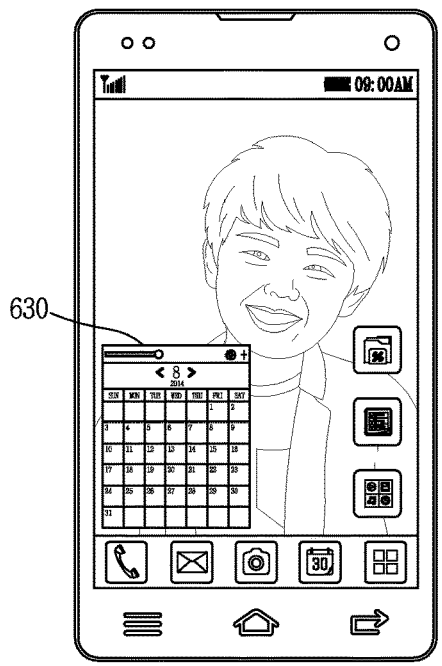
Figure 6D:
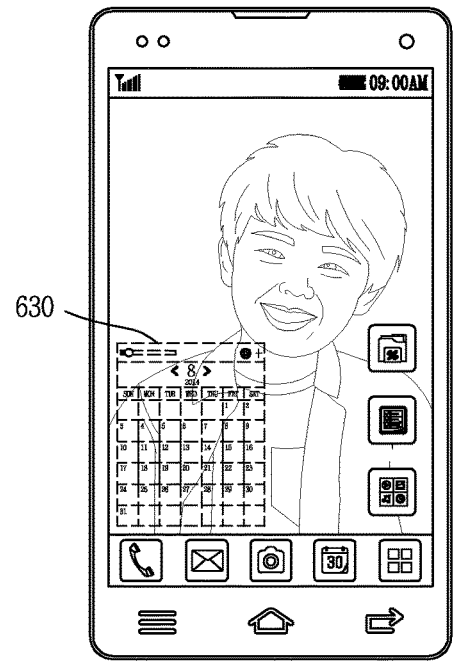

As another example, as illustrated in (a) and (c) of FIG. 6C, the controller 180 may output the popup window 620 including the graphic objects 601, 602, 603 and 604 grouped in the folder image 610 in a manner of adjusting the transparency of the popup window 620. In this instance, the controller 180 may control the display unit 151 to transparently output the popup window 620 so as to prevent the popup window 620 from obscuring the specific region 400.

Accordingly, the display unit can be controlled to output graphic objects in the manner of preventing the graphic objects from overlapping a specific region of a home screen page. In addition, a folder image can be used to provide an additional region for outputting graphic objects on the home screen page with the limited output region.

Meanwhile, the present invention may be applied to any case of outputting a popup window in an overlapping manner, as well as the folder image. For example, as illustrated in (a), (b), (c), and (d) of FIG. 6D, when a popup window 630 indicating a video reproduction is output on at least a part of the display unit 151, the controller 180 may control a size, a position and transparency of the popup window and control the display unit 151 not to output the popup window 630 on the specific region 400.

Figure 7A:
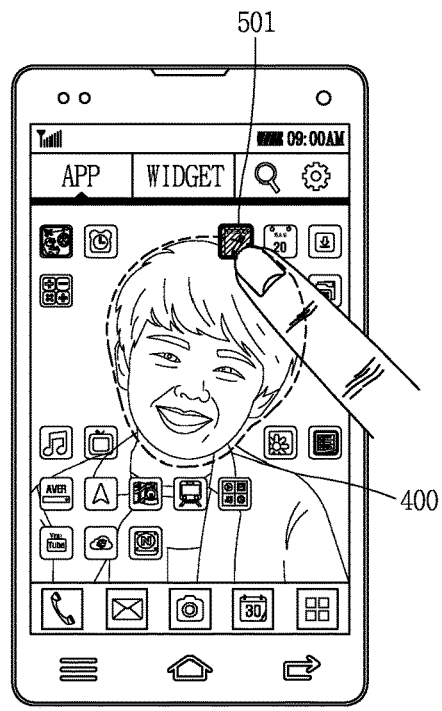
FIGS. 7A(a), 7A(b), 7B(a) and 7B(b) are conceptual views illustrating a method of outputting a graphic object, which is output on a specific region in an overlapped state, on the other region except for the specific region.
Figure 7A:
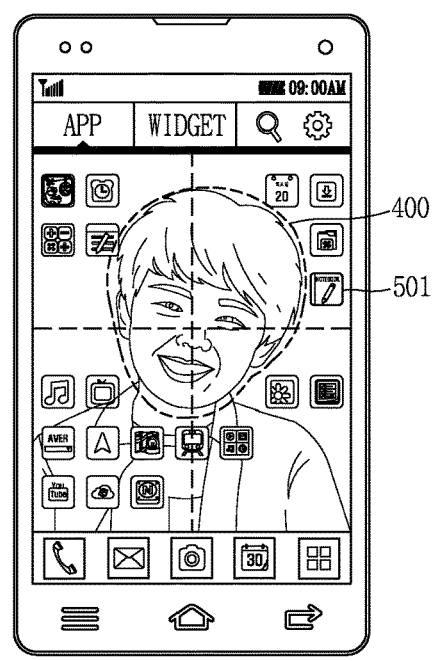
Figure 7B:
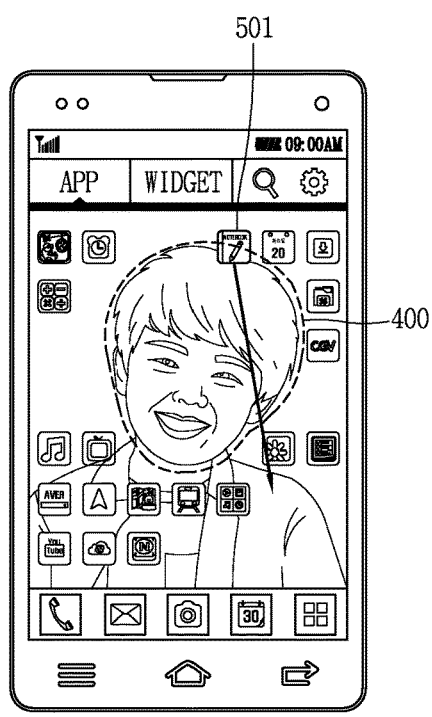
Figure 7B:
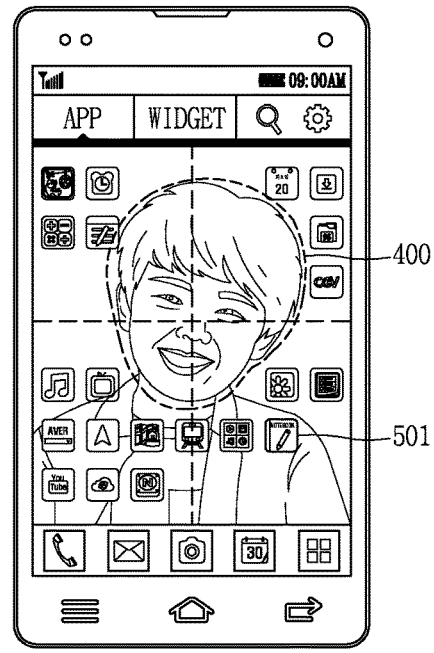

The foregoing description has been given of the method of using the folder image when an empty space except for the specific region is not detected on the home screen page. Hereinafter, description will be given of a method of outputting a graphic object, which is currently output in a manner of overlapping the specific region, on the other region except for the specific region. FIGS. 7A and 7B are conceptual views illustrating a method of outputting a graphic object, which is output on a specific region in an overlapped state, on the other region except for the specific region.

The present invention can control the display unit not to output graphic objects, which are included on the home screen page, on the specific region of the home screen page. Here, the controller 180 may control the display unit 151 to display at least one graphic object, which is output on the specific region, on the other region except for the specific region.

When the at least one graphic object output on the specific region is moved to be output on the other region, the controller 180 may decide an output position of the at least one graphic object on the basis of a preset virtual reference line.

In more detail, the controller 180 may include at least one reference line which divides an entire output region of the display unit 151 into at least two virtual regions. For example, as illustrated in (b) of FIG. 7A, the controller 180 may include two reference lines which divide the entire output region of the display unit 151 into four virtual regions. Afterwards, the controller 180 may move the at least one graphic object included on the specific region to a virtual region within a virtual region in which the graphic object is included.

For example, as illustrated in (a) and (b) of FIG. 7A, the display unit 151 may be divided into four virtual regions based on two virtual reference lines. Here, for the sake of explanation, the four virtual regions may be referred to as, starting from a left upper region in a clockwise direction, a first quadrant, a second quadrant, a third quadrant and a fourth quadrant.

The controller 180 may detect which quadrant the graphic object 501 output on the specific region 400 belongs to. Afterwards, the controller 180 may move the graphic object 501 output on the specific region 400 to the other region except for the specific region within the quadrant to which the graphic object 501 belongs.

For example, as illustrated in (b) of FIG. 7A, when the graphic object 501 output on the specific region 400 belongs to the second quadrant, the controller 180 may control the display unit 151 to output the graphic object 501 on the other region except for the specific region within the second quadrant.

When the virtual region does not have therein an empty space to move the graphic object 501 output on the specific region, the controller 180 may move the graphic object 501 to another virtual region, on which the graphic object is not output, according to a preset order.

Here, the preset order may be one of a clockwise direction or a counterclockwise direction. For example, when the preset order has the clockwise direction, the controller 180 may detect an empty space to output the graphic object 501 in the clockwise order, on the basis of a quadrant to which the graphic object 501 belongs.

For example, as illustrated in (a) of FIG. 7B, the graphic object 501 output on the specific region 400 may belong to the second quadrant. Also, the controller 189 may detect that the second quadrant does not have an empty space to which the graphic object output on the specific region is to be moved for output.

Afterwards, the controller 180 may detect whether or not the third quadrant located in the clockwise direction based on the second quadrant has an empty space to output the graphic object 501 output on the specific region 400.

When the third quadrant has the space for outputting the graphic object 501 currently output on the specific region 400, the controller 180 may control the display unit 151 to output the graphic object 501, which is currently output on the specific region 400, on the third quadrant.

That is, according to the present invention, even when a graphic object output on a specific region is moved to the other region except for the specific region, the graphic object may be moved according to a preset reference.

Figure 8A:
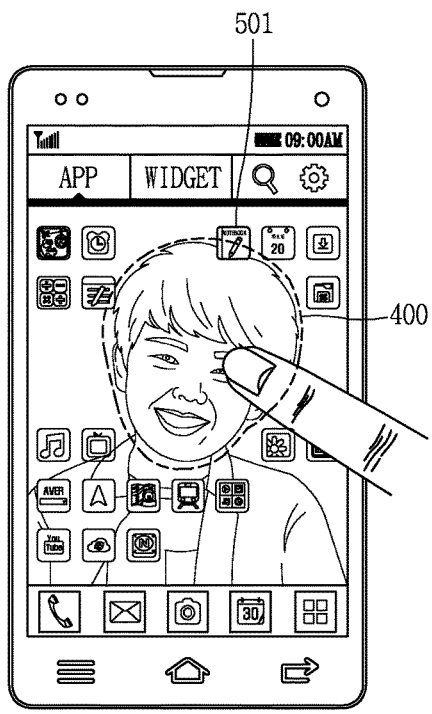
FIGS. 8(a) and 8(b) are conceptual views illustrating a method of visually distinguishing a graphic object output on a specific region from the other graphic objects, when the specific region is set.
Figure 8B:
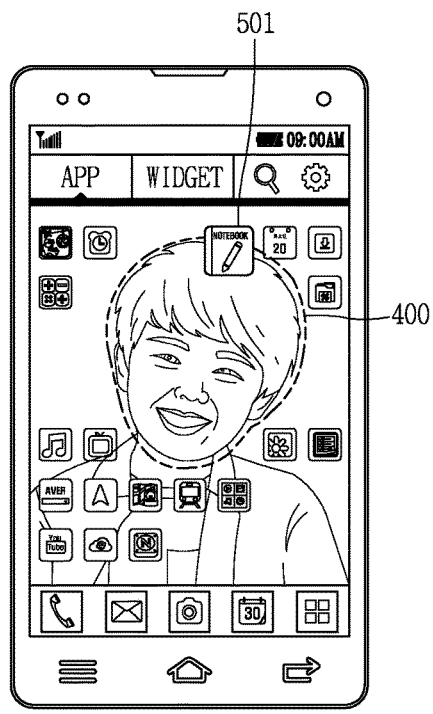

The foregoing description has been given of the method of moving the graphic object output on the specific region to the other region of the home screen page except for the specific region. Hereinafter, description will be given of a method of visually discriminating a graphic object located on a specific region from the other graphic objects when the specific region is set. FIG. 8 is a conceptual view illustrating a method of visually discriminating a graphic object output on a specific region from the other graphic objects, when the specific region is set.

According to the present invention, when a specific region on which a graphic object is not to be output on a home screen page is set, a graphic object output on the specific region may be detected from a plurality of graphic objects belonging to the home screen page.

When the graphic object output on the specific region is detected, the controller 180 may display the graphic object output on the specific region to be visually distinctive from the other graphic objects. To this end, the controller 180 may change at least one of a size, a color and transparency of the graphic object output on the specific region, or provide an animation effect (for example, a flickering effect) to the graphic object.

For example, as illustrated in (a) and (b) of FIG. 8, the controller 180 may output the graphic object output on the specific region by changing the size and the transparency of the graphic object. Accordingly, the user can recognize information relating to a graphic object whose output position is to change.

The foregoing description has been given of the method of outputting the graphic object output on the specific region in the visually discriminating manner. Hereinafter, description will be given of a method of arranging a plurality of graphic objects belonging to a home screen page when a posture of a main body of a mobile terminal changes. FIGS. 9A to 9D are conceptual views illustrating a method of arranging a plurality of graphic objects included on a home screen page when a posture of a main body of a mobile terminal changes.

The mobile terminal according to the one exemplary embodiment of the present invention may define a posture of a main body 100 thereof aligned with a reference line as a first posture, and a posture of the main body 100 rotated by 90° from the reference line as a second posture on the basis of the reference line formed along the gravity direction. The first posture may also be referred to as a vertical direction and the second posture as a horizontal posture.

The mobile terminal according to the one exemplary embodiment of the present invention may further include a posture sensing unit that is configured to sense a posture of the main body 100. Here, the posture sensing unit may sense the posture of the main body 100 by use of a gravity sensor, an acceleration sensor and the like.

The controller 180 may output the home screen page on the display unit 151 when the main body 100 is placed at the first posture. Afterwards, the controller 180 may sense the change of the posture of the main body 100 into the second posture.

Here, when the change of the posture of the main body 100 is sensed, the controller 180 may arrange a background screen 350 and graphic objects 901, 902 and 903 which belong to the home screen page to be appropriate for the changed posture.

In more detail, when the posture of the main body 100 is changed from the first posture into the second posture, the controller 180 may shift output positions of the graphic objects 901, 902 and 903 output on the home screen page, while maintaining an output direction of the background screen 350.

Here, the controller 180 may output the plurality of graphic objects 901, 902 and 903 on the other region, except for a specific region 400, of the output region of the home screen page.

Here, the specific region 400 may change based on the first posture and the second posture. More specifically, the specific region 400 may be defined based on a condition related to an image output on the specific region 400. Here, the image output on the specific region 400 may be output on a different position in response to the change in the posture of the main body 100. In this instance, the specific region 400 may change as the output position of the image output on the specific region 400 changes.

Figure 9A:
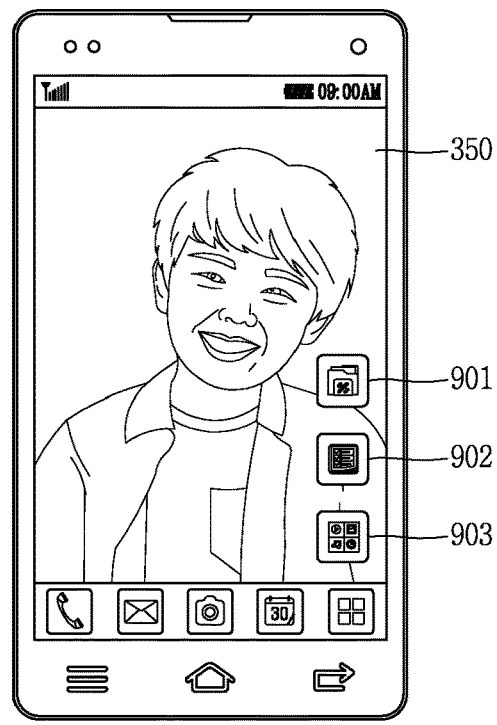
FIGS. 9A(a), 9A(b), 9B(a), 9B(b), 9C(a), 9C(b), 9C(c), 9D(a) and 9D(b) are conceptual views illustrating a method of arranging a plurality of graphic objects output on a home screen page, when a posture of a main body of a mobile terminal changes.
Figure 9A:
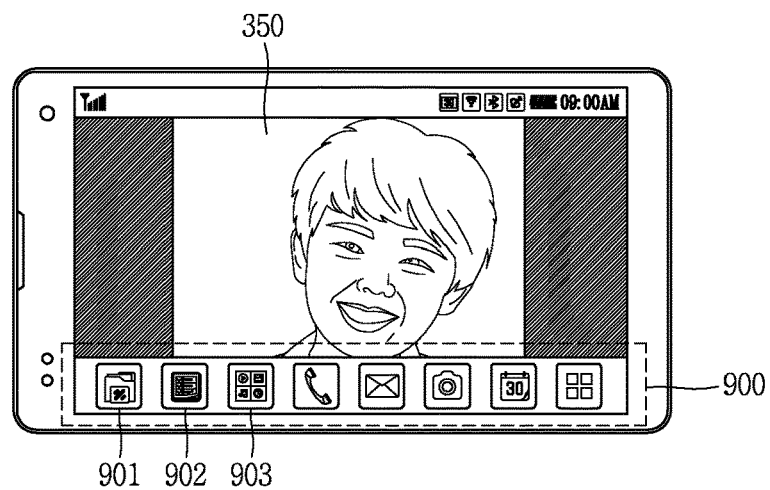

For example, as illustrated in (a) of FIG. 9A, at the first posture of the main body 100, the specific region 400 may be set through a face recognition with respect to the background screen 350. Also, the controller 180 may set a region with a facial image output thereon to the specific region 400.

Here, as illustrated in (b) of FIG. 9A, the posture of the main body 100 may be changed from the first posture into the second posture. In this instance, at the second posture of the main body 100, the controller 180 may redetect a region where the facial image is output and reset the detected region to the specific region 400.

Afterwards, at the second posture of the main body 100, the controller 180 may output the plurality of graphic objects 901, 902 and 903 on the other region, except for the specific region, of the home screen page.

Meanwhile, at the second posture of the main body 100, a horizontally wide screen may be provided so as to allow for utilization of both lateral spaces of the display unit 151. Also, in view of the horizontally wide screen, the plurality of graphic objects 901, 902 and 903 may be arranged in series on a lower region of the screen. Therefore, in the present invention, the plurality of graphic objects 901, 902 and 903 may be arranged in series on the both lateral spaces or the lower region of the display unit 151.

In more detail, as illustrated in (b) of FIG. 9A, the controller 180 may arrange the plurality of graphic objects 901, 902 and 903 in series on the lower portion of the display unit 151.

Figure 9B:
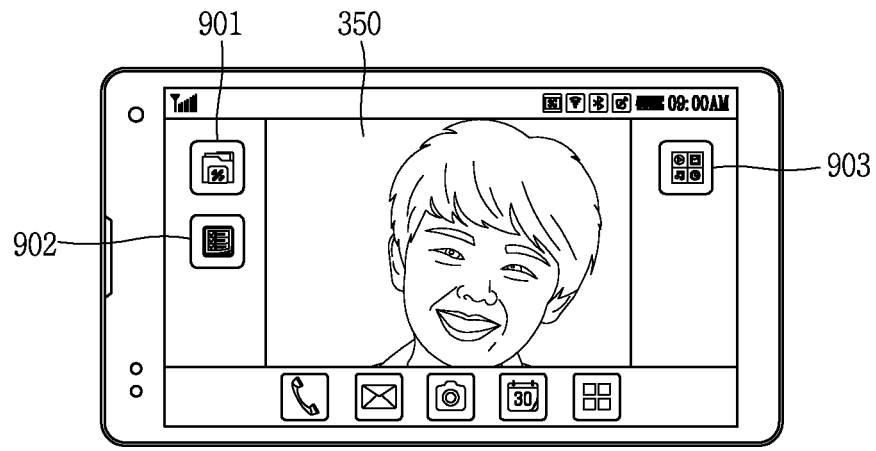
Figure 9B:
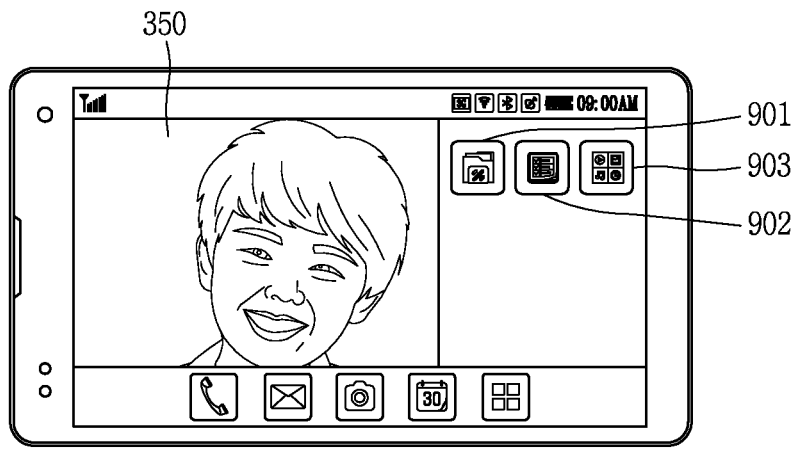

As another example, as illustrated in (a) and (b) of FIG. 9B, the controller 180 may arrange the graphic objects 901, 902 and 903 on at least a part of a left or right region of the display unit 151.

The graphic objects may always be visible at the second posture. However, when the main body 100 is placed at the second posture, the controller 180 may decide whether or not to output the graphic objects according to a preset condition. That is, according to the present invention, at the second posture of the main body 100, icons may be output only under a specific condition for efficient usage of the vertically narrow display unit 151.

Here, the preset condition may correspond to whether or not an object is present adjacent to the display unit 151. That is, the present invention provides a method of efficiently using the display unit 151 by outputting a plurality of graphic objects when a user intends to touch the display unit 151.

Figure 9C:
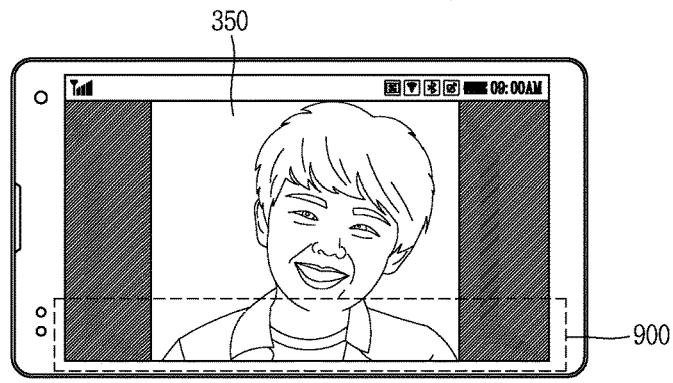
Figure 9C:
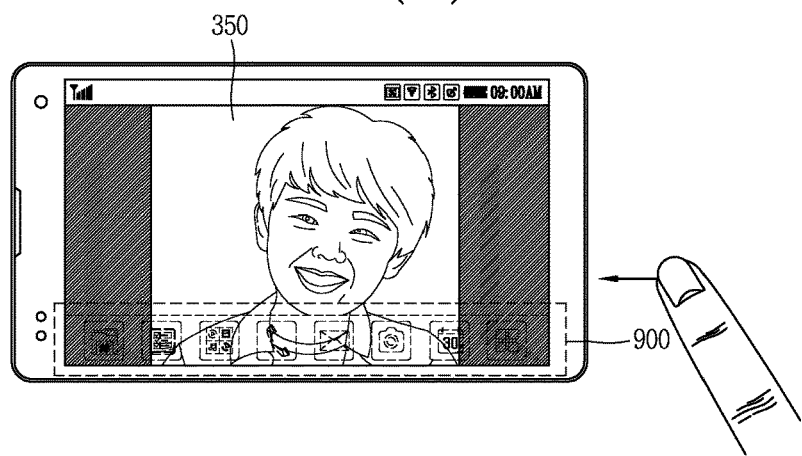
Figure 9C:
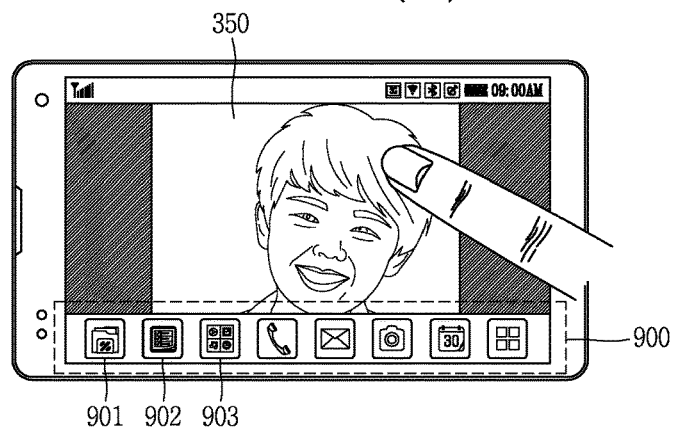

For example, as illustrated in (a) of FIG. 9C, when the main body 100 is placed at the second posture, the controller 180 may output only the background screen 350 without outputting the plurality of graphic objects belonging to the home screen page.

Here, as illustrated in (b) of FIG. 9C, the controller 180 may sense that a finger is present adjacent to the display unit 151. In this instance, the controller 180 may output the plurality of graphic objects belonging to the home screen page on the display unit 151.

Here, the plurality of graphic objects may be output in a manner that their transparencies are adjusted according to a relative distance between the object and the display unit 151. For example, as illustrated in (b) of FIG. 9C, when the relative distance between the user's finger and the display unit 151 is closer, the plurality of graphic objects may be output more clearly.

Meanwhile, at the second posture of the main body 100, the controller 180 may be likely to fail to output all of the plurality of graphic objects, which belong to the home screen page, on the display unit 151 in case of outputting the plurality of graphic objects in series on the lower region.

In this instance, the controller 180 may output only at least some of the plurality of graphic objects on the display unit 151. Here, the controller 180 may output the other graphic objects, which have not been output on the display unit 151, back on the display unit 151.

Figure 9D:
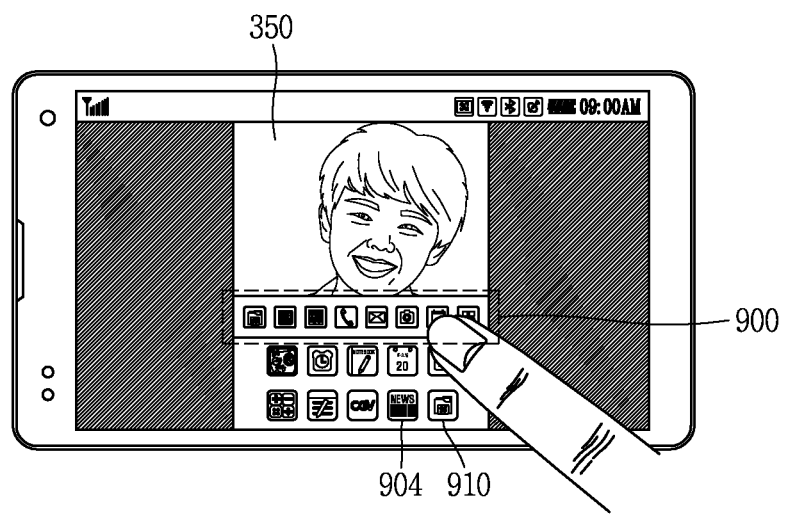
Figure 9D:
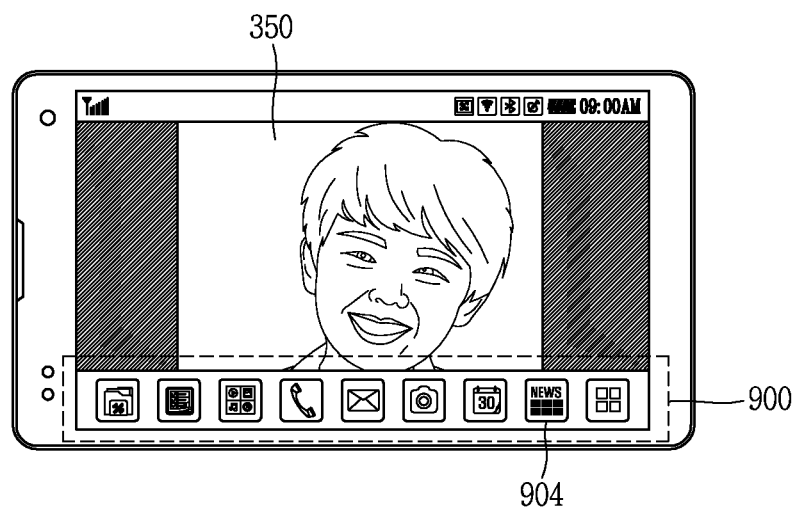

For example, as illustrated in (a) of FIG. 9D, when a preset touch is applied to a lower region 900, on which the plurality of graphic objects are output in series, the controller 180 may output the other graphic objects, which have not currently been output, near (910) of the lower region 900.

Here, the controller 180 may move one graphic object 904 of the other graphic objects into the lower region 900 in response to a drag input applied to the graphic object 904. When the graphic object 904 is moved into the lower region 900, as illustrated in (b) of FIG. 9D, the graphic object 904 can be output on the lower region 900.

Although not illustrated, the plurality of graphic objects may be moved along a drag input that is applied to the lower region 900 in a left or right direction. Here, the controller 180 may move the currently-output graphic object along the direction of the drag input, such that at least some of the currently-output graphic objects can disappear from the display unit 151 and graphic objects without being output can be newly output by the moved distance.

The foregoing description has been given of the method of arranging the graphic objects according to the characteristic of the display unit 151 in response to the change in the posture of the main body. The present invention has illustrated the arrangement of the graphic objects which is changed according to the posture of the present invention, but may also be applied to an electronic device having a display unit which has a limited output region. For example, for a wearable device having a display unit wearable on a wrist, the present invention can also be applied to the display unit of the wearable device which has the limited output region.

Hereinafter, description will be given of a method of utilizing a specific region without a graphic object output thereon in more detail. FIGS. 10A, 10B, 11A and 11B are conceptual views illustrating a method of associating a function relevant to a specific region with the specific region.

When a home screen page includes a specific region on which a graphic object is not output, at least one function may be associated with the specific region. Here, the function associated with the specific region may be a function relevant to an image output on the specific region. In more detail, when a facial image of a particular person is output on the specific region, the function associated with the specific region may be a function of placing a call to the person, a function of sending a message to the person, a function of sharing information with the person and the like.

Figure 10A:
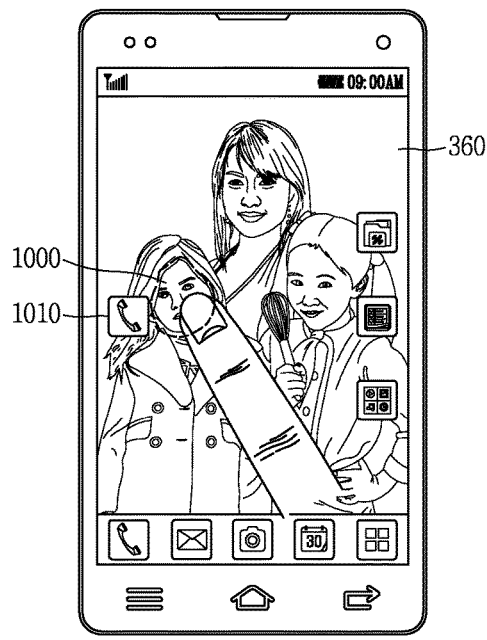
FIGS. 10A(a), 10A(b), 10A(c), 10B(a), 10B(b), 10B(c), 11A(a), 11A(b), 11A(c), 11B(a), 11B(b), 11B(c) and 11B(d) are conceptual views illustrating a method of associating a function relevant to a specific region with the specific region.
Figure 10A:
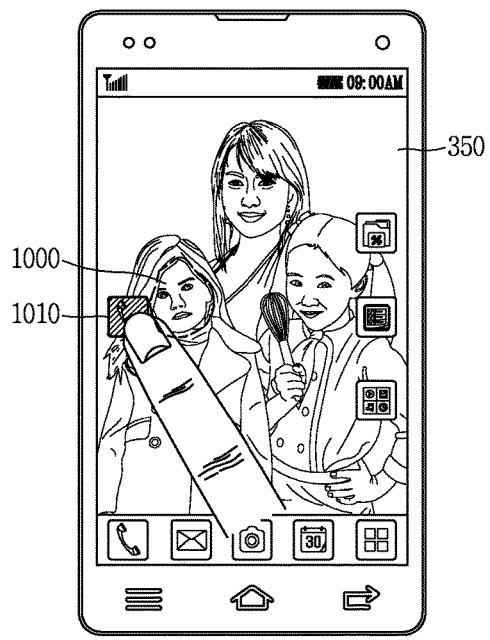
Figure 10A:

For example, as illustrated in (a) of FIG. 10A, a facial image of a particular person output on a background screen 360 of a home screen page may be recognized. Here, the controller 180 may set a region on which the facial image of the particular person is output to a specific region 1000.

Also, when at least one function is associated with the specific region 1000, the controller 180 may output at least one graphic object 1010 indicating the at least one function in the vicinity of the specific region 1000, in response to a preset touch being applied to the specific region 1000. For example, as illustrated in (b) of FIG. 10A, when a long touch is applied to the specific region 1000, the controller 180 may output the graphic object 1010 indicating a function of placing a call to the particular person in the vicinity of the specific region 1000.

Although not illustrated, when at least two functions are associated with the specific region 1000, the controller 180 may output graphic objects indicating the at least two functions, respectively, in the vicinity of the specific region 1000.

Here, when a touch is applied to the graphic object 1010 indicating a function associated with the specific region 1000, the controller 180 may perform the function. For example, as illustrated in (b) and (c) of FIG. 10A, when a touch applied to the graphic object 1010 indicating a function of placing a call to the particular person is sensed, then the controller 180 may dial to the particular person.

Meanwhile, when a preset touch applied to the specific region 1000 is sensed, a screen for setting a function to be associated with the specific region 1000 may be output. The preset touch may be set by a user or preset.

Figure 10B:
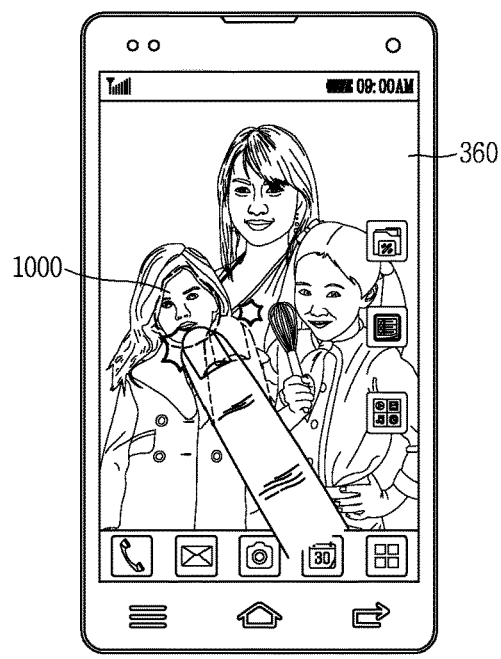
Figure 10B:
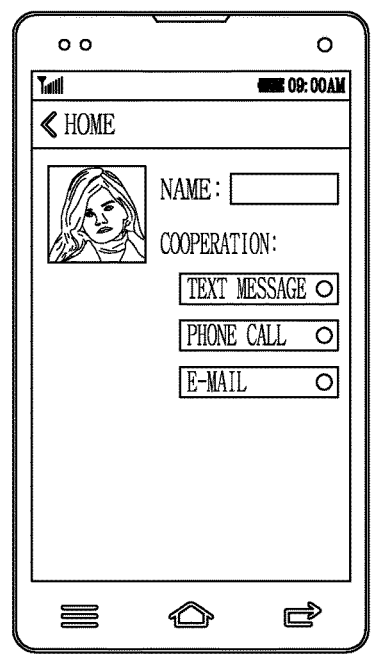
Figure 10B:
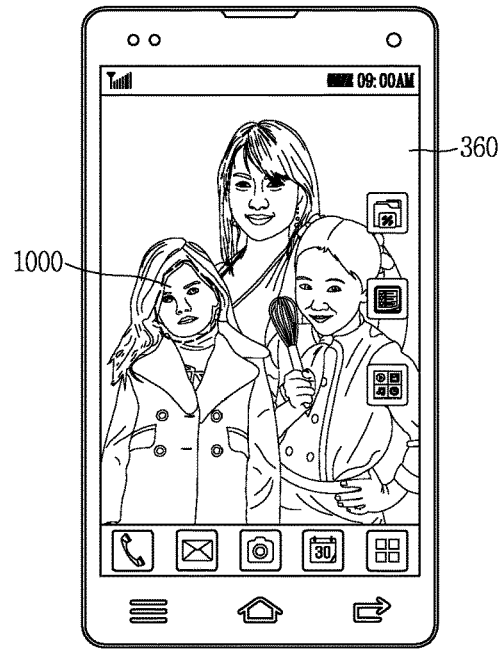

For example, as illustrated in (a) of FIG. 10B, the controller 180 may sense a double touch applied to the specific region 1000 within a preset time. Here, as illustrated in (b) of FIG. 10B, the controller 180 may output a setting screen for setting a function to be associated with the specific region 1000 on the display unit 151. The controller 180 may allow the user to input the function to associate with the specific region 1000 through the setting screen.

Also, a function of reproducing information tagged to the background screen may be associated with the specific region. Here, the tagged information is information which is stored by being associated with an image, and may be information related to the image, such as a place, a time, a recorded voice, a written memo and the like at the moment of capturing the image.

Also, the controller 180 may output a graphic object relevant to the tagged information on the background screen. Here, the graphic object may be output on the background screen or always output on one region of the background screen, in response to a preset touch. Here, a graphic object 1210 relating to the tagged information may indicate a type of the tagged information, and be associated with a function of outputting the tagged information.

Figure 11A:
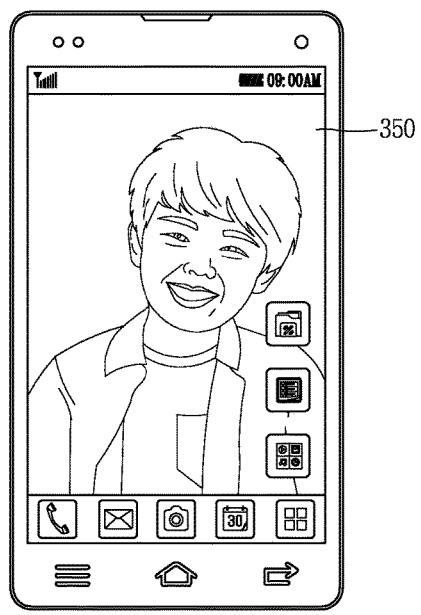
Figure 11A:
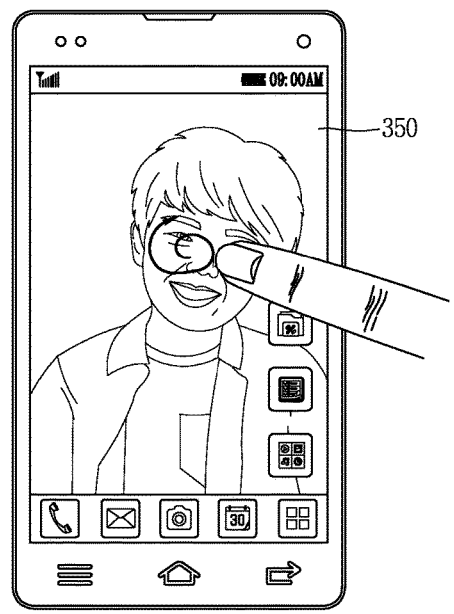
Figure 11A:
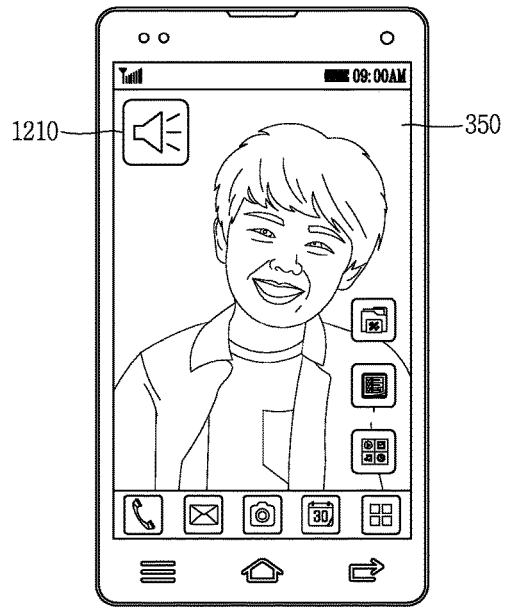

For example, as illustrated in (a) and (b) of FIG. 11A, when a preset touch applied to the specific region 400 is sensed, the controller 180 may control the graphic object 1210 related to the tagged information to be output.

When a preset touch is applied to the specific region 400, the controller 180 may output the tagged information immediately. Here, when the tagged information is a voice, the voice may be output through a microphone. When the tagged information is a memo, the memo may be output on the display unit 151.

Figure 11B:
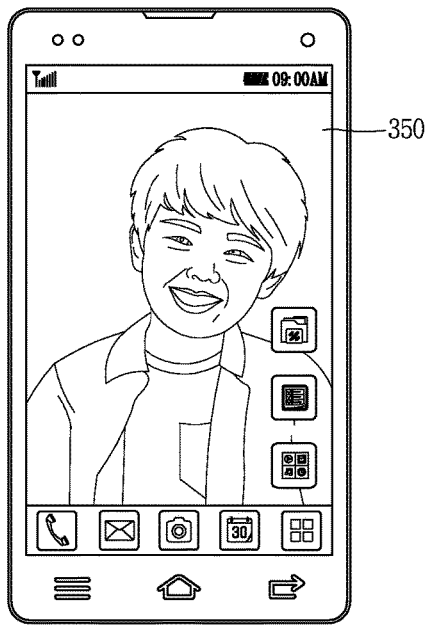
Figure 11B:
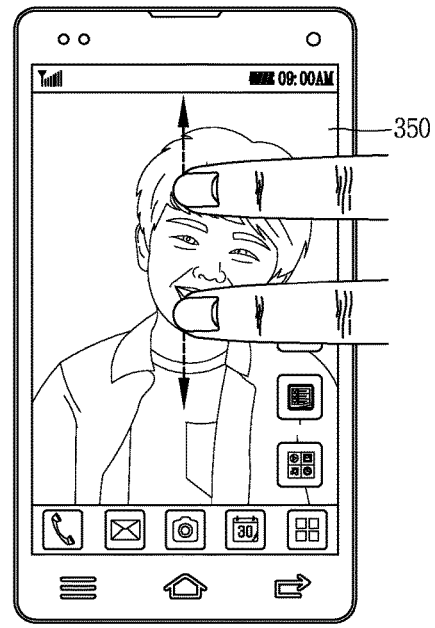
Figure 11B:
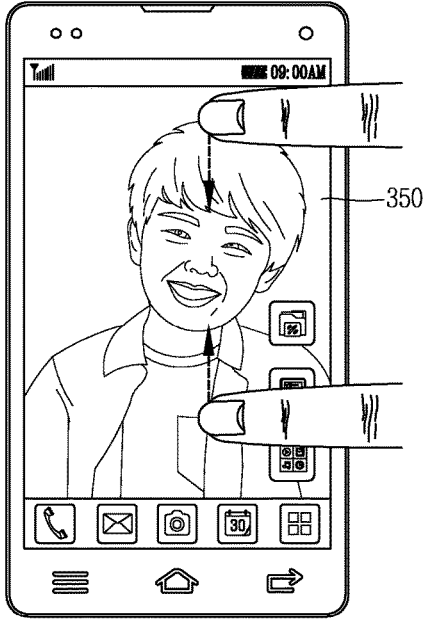
Figure 11B:
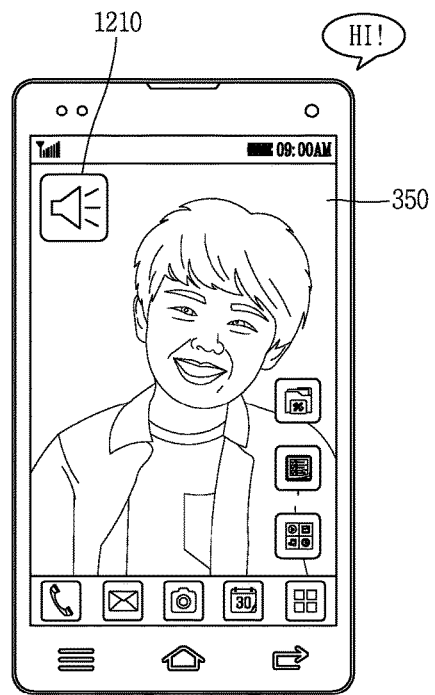

For example, as illustrated in (b) and (c) of FIG. 11B, when the tagged information is a voice, the controller 180 may output the voice, in response to a pinch-out touch applied to the specific region.

In addition, as illustrated in (d) of FIG. 11B, the controller 180 may stop the output of the voice, in response to a pinch-in touch applied to the specific region while the voice is output.

Similar to associating a function to the specific region, the controller 180 may also associate information with the specific region and store the associated information.

Accordingly, various functions can be carried out on the home screen page. Also, a region without a graphic object output thereon on a home screen page can be utilized in more various manners.

Figure 12A:
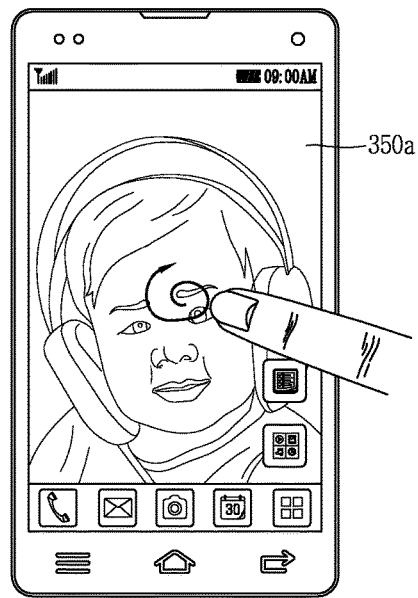
FIGS. 12A(a), 12A(b), 12A(c), 12A(d) and 12B are conceptual views illustrating a method of utilizing history information related to a home screen page in a mobile terminal in accordance with one exemplary embodiment of the present invention.
Figure 12A:
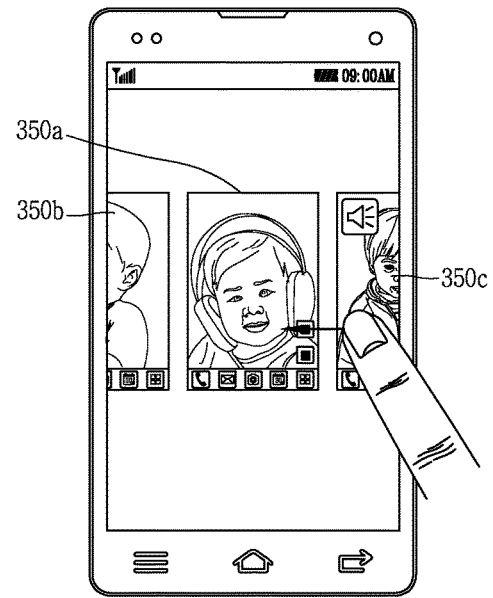
Figure 12A:
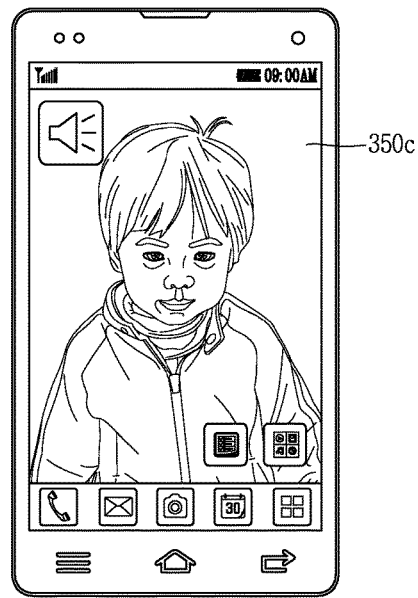
Figure 12A:
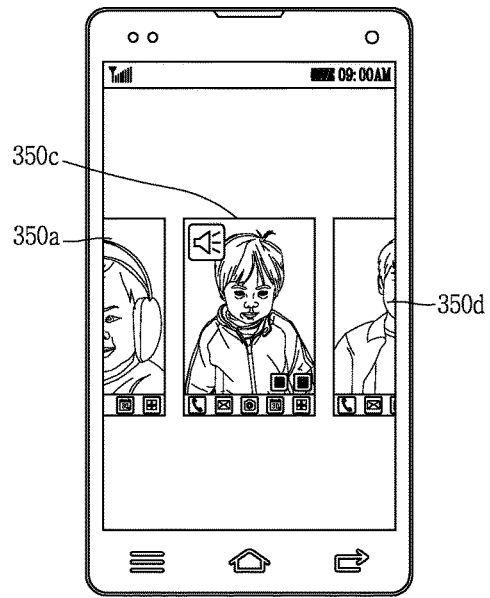
Figure 12B:
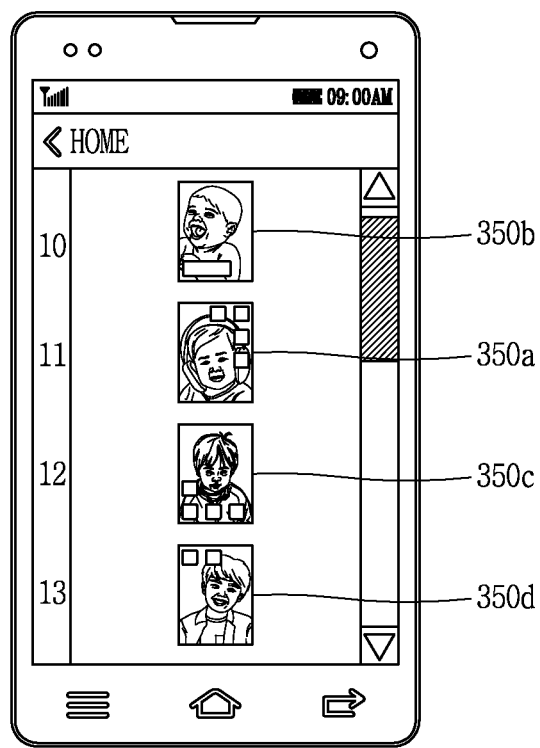

The foregoing description has been given of the method of utilizing the specific region on which any graphic object is not output. Hereinafter, description will be given of a method of utilizing history information relating to a home screen page. FIGS. 12A and 12B are conceptual views illustrating a method of utilizing history information related to a home screen page in a mobile terminal in accordance with one exemplary embodiment of the present invention.

In accordance with the present invention, an arrangement of a background screen and a plurality of graphic objects output on a home screen page can be set. In addition, the mobile terminal according to the one embodiment disclosed herein may further include a memory 170 for storing history information relating to a change history of a home screen page.

Here, the history information may be information related to the background screen of the home screen page, information indicating an arrangement of the graphic objects on the background screen, information indicating a function associated with the background screen, and the like. Here, the information indicating the arrangement of the graphic objects on the background screen may refer to information relating to a specific region of the background screen on which any graphic object is not output. Also, the information indicating the arrangement of the graphic objects on the background screen may refer to an output position of each of the graphic objects.

Here, as illustrated in (a) of FIG. 12A, the controller 180 may output the history information on the display unit 151 when a preset touch is applied to the background screen. For example, as illustrated in (b) of FIG. 12A, the controller 180 may output the history information, in response to a touch drawing a pattern equal to a preset pattern being sensed on the home screen page. The preset pattern may be preset by a user. Also, the preset touch may be various.

The controller 180 may set a background screen, which has been set to a home screen page before, and arrangement information related to icons on the background screen back to the home screen page. That is, the controller 180 may read out (or open) both the background screen and the arrangement information relating to the graphic objects on the background screen through the history information.

For example, as illustrated in (c) and (d) of FIG. 12A, when one of the history information is selected, the controller 180 may change a current home screen page into a hone screen page indicated by the selected history information.

That is, the home screen page currently output on the display unit 151 may be changed into a background screen and the arrangement of the graphic objects output on the background screen, which are indicated by the selected history information.

Accordingly, a background screen which has been set to a home screen page before and arrangement information on icons which have been output on the background screen can be provided through the history information.

Meanwhile, the controller 180 may provide the history information in various manners. For example, as illustrated in (b) of FIG. 12A, the history information may be output on the display unit 151 in the order of being stored in the memory 170.

As another example, as illustrated in FIG. 12B, the history information may be output on the display unit 151 in the order of time information tagged to an image which has been set as a background screen. This may allow a user to be provided with images which have been stored as a background screen before, in the time-based order.

Figure 13A:
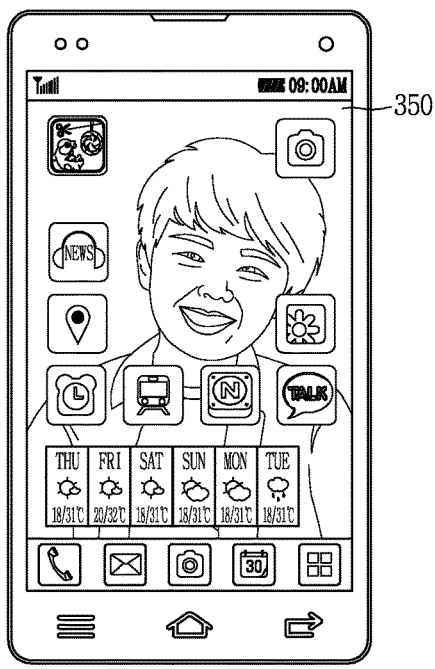
FIGS. 13(a), 13(b) and 13(c) are conceptual views illustrating a method of recommending a background screen with a specific region set thereon.
Figure 13B:
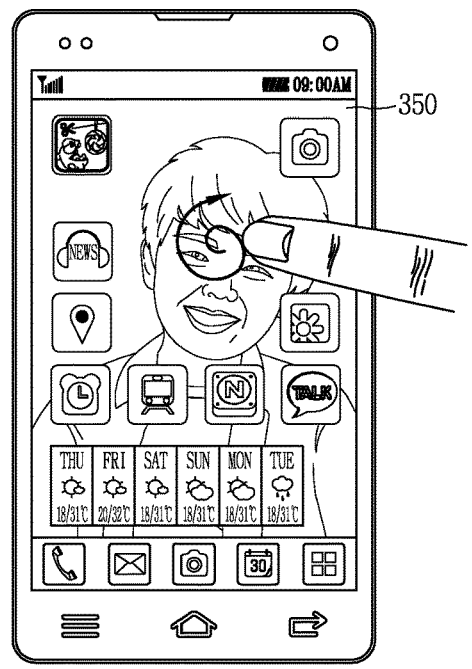
Figure 13C:
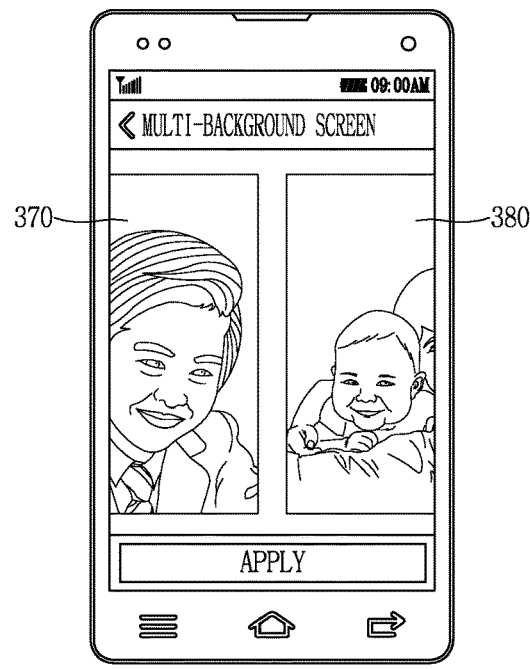
Figure 14A:
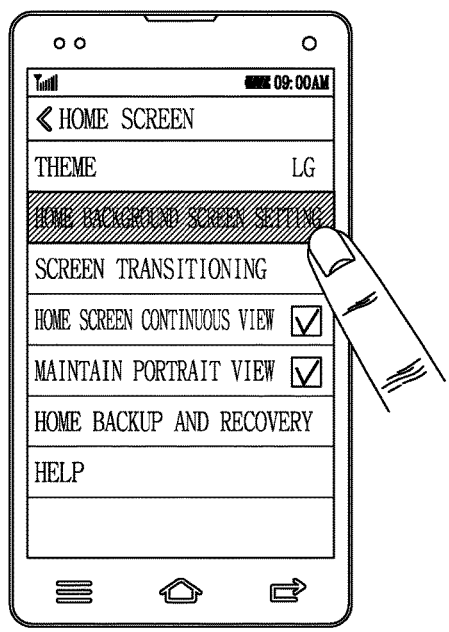
FIGS. 14(a), 14(b), 14(c) and 14(d) are conceptual views illustrating a method of setting a background screen of a home screen page.
Figure 14B:
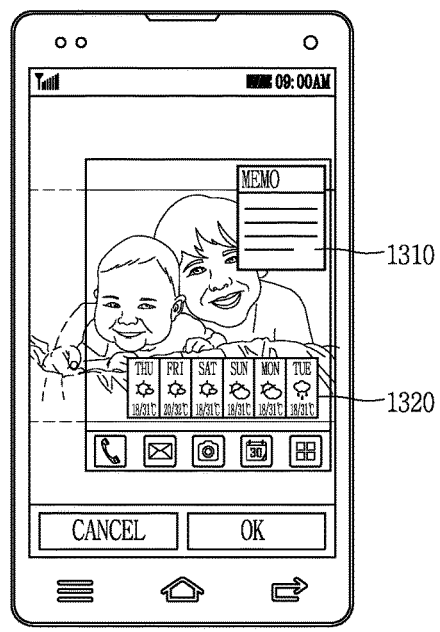
Figure 14D:
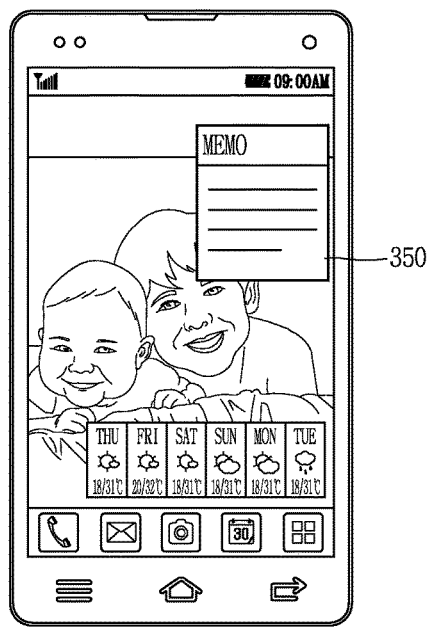
Figure 14C:
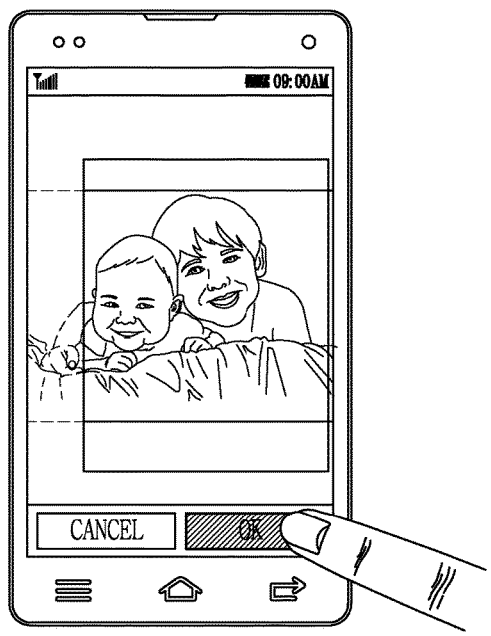

Hereinafter, description will be given of a method of recommending a background screen with a specific region set thereon. FIG. 13 is a conceptual view illustrating a method of recommending a background screen with a specific region set thereon.

The present invention can set a specific region, on which any graphic object is not to be output, of an output region of a home screen page. Meanwhile, a background screen 350 of the home screen page may change into another image. In more detail, the user may set one of a plurality of images stored in the memory 170 to a background screen of the home screen page.

In this instance, the controller 180 may detect at least one recommended image 370, 380 among the plurality of images stored in the memory 170 without changing an arrangement state of currently-output graphic objects as much as possible.

More specifically, as illustrated in (b) of FIG. 13, the controller 180 may sense a drag input of drawing a pattern equal to a preset pattern, which is applied to a specific region.

The controller 180 may detect size and position of the specific region in response to the drag input of drawing the pattern equal to the preset pattern. Afterwards, the controller 180 may detect at least one image, in which a facial image is output on a region having similar size and position to the specific region.

For example, as illustrated in (c) of FIG. 13, the controller 180 may output at least one image 370, 380, in which a facial image is output on a region similar to the specific region, on the display unit 151.

Meanwhile, a plurality of home screen pages may be set, and each home screen page may have the same background screen or a different background screen. That is, the controller 180 may control each of the plurality of home screen pages to include the at least one image 370, 380, or control all of the plurality of home screen pages to be changed into one of the at least one image 370, 380.

Here, when the at least one image 370, 380 is selected, the controller 180 may change the background screen into the selected at least one image 370, 380.

In this instance, any graphic object can be prevented from being output on the specific region which has been set not to output a graphic object thereon, with the least change in a previous arrangement state of graphic objects.

Accordingly, the specific region on which any graphic object is not to be output may be maintained on the home screen page. By maintaining the specific region without a graphic object, a function associated with the specific region can be provided to a user as it is even though a background screen changes.

The foregoing description has been given of the method of changing the background screen with the least change in the arrangement state of the plurality of graphic objects on the home screen page. Hereinafter, a step of setting a background screen of a home screen page will be described. FIG. 14 is a conceptual view illustrating a method of setting a background screen of a home screen page.

The mobile terminal according to the present invention can show in advance an arrangement state of a plurality of graphic objects, which are to be arranged on a home screen page upon setting a background screen of the home screen page. More specifically, on a setting screen for setting a background screen of a home screen page, the controller 180 may output in advance a plurality of graphic objects 1310 and 1320 on an image, which is to be set to the background screen.

That is, by using the fact that an output region of the home screen page is smaller than an output size of an image, a part of the image can be set to the background screen of the home screen page.

In more detail, regarding the point that a part of an image is set to a background screen, when the part of the image is set to the background screen, an arrangement relationship between the background screen and a plurality of graphic objects may be output on the display unit 151 in advance to be provided to the user.

For example, as illustrated in (a) and (b) of FIG. 14, when a function of setting a background of a home screen page is selected, the controller 180 may output an image to be used as the background screen and graphic objects 1310 and 1320 output on the home screen page.

Here, the controller 180 may also output a guide image guiding a region, which is to be set to the background screen, of the image region. In this instance, the region to be set to the background screen can be selected from the image region by touching the guide image.

Meanwhile, the controller 180 may also move the plurality of graphic objects 1310 and 1320 included on the home screen page, as well as moving the guide image. Accordingly, the controller 180 may provide in advance a relative arrangement relationship between the plurality of graphic objects and the background screen on the home screen page.

Afterwards, as illustrated in (c) and (d) of FIG. 14, when the part of the image is selected, the home screen page which has the part of the image as the background screen may be output on the display unit 151. This may allow the user to set in advance an image to be output on a specific region, on which a graphic object is not to be output, upon setting the background screen of the home screen page.

Figure 15A:
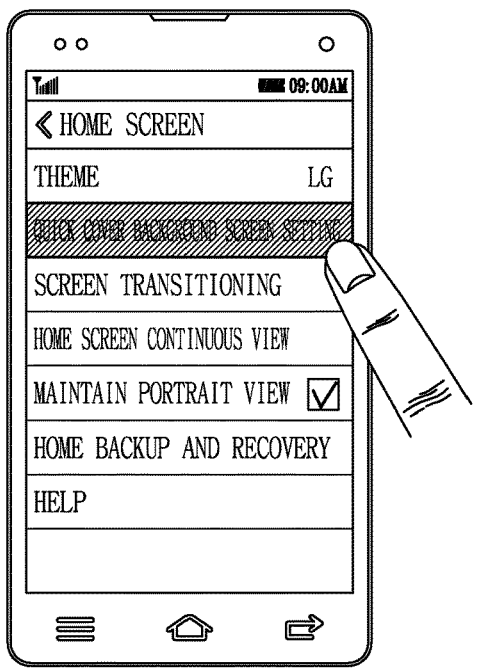
FIGS. 15(a), 15(b) and 15(c) are conceptual views illustrating a method of setting an image to be output on a cover in a mobile terminal having the cover.
Figure 15B:
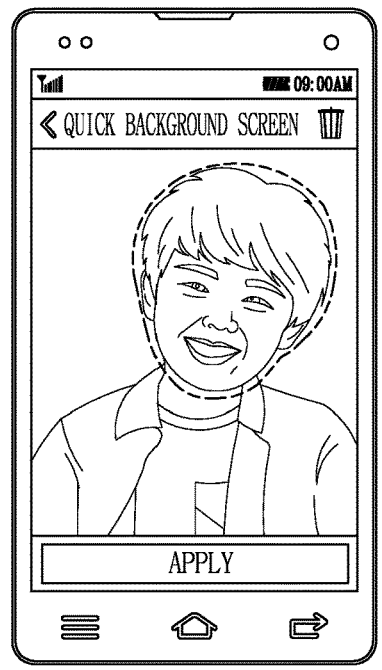
Figure 15C:
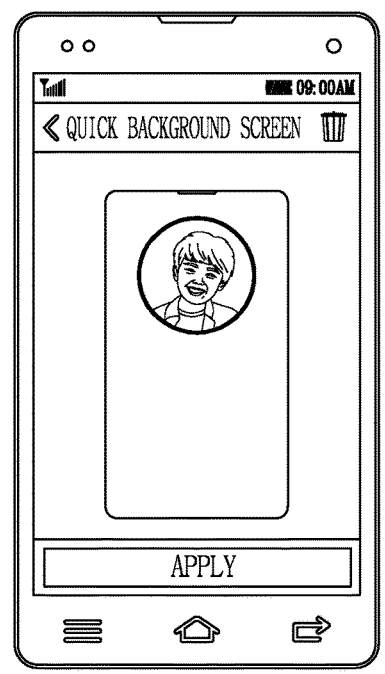

The method of setting the background screen has been described so far. Hereinafter, description will be given of a method of setting an image displayed on a cover in a mobile terminal further comprising the cover that covers a part of a display unit. FIG. 15 is a conceptual view illustrating a method of setting an image to be output on a cover in a mobile terminal having the cover.

As illustrated in FIG. 15, the mobile terminal according to the one embodiment disclosed herein may further include a cover unit 1400 that is configured to cover a part of the display unit 151. Here, the cover unit 1400 may further include a display module 151' which is operable with the display unit 151 of the mobile terminal. Also, the display module 151' of the cover unit 1400 may output screen information, independent of the display unit 151 of the mobile terminal. In addition, the display module 151' of the cover unit 1400 may be formed transparent such that screen information output on the display unit 151 of the mobile terminal can be viewed.

Meanwhile, the display module 151' of the cover unit 1400 may be cooperative with the display unit 151 so as to display at least a part of the display unit 151. Here, the controller 180 may automatically set an image to be displayed on the display module 151' of the cover unit 1400.

In more detail, the controller 180 may set a specific region 400, on which any graphic object is not output, of an output region of the home screen page displayed on the display unit 151, to an image to be output on the cover unit 1400.

That is, the display module 151' of the cover unit 1400 may display a part of the background screen on the home screen page, rather than a plurality of graphic objects on the home screen page.

For example, as illustrated in (a), (b) and (c) of FIG. 15, the controller 180 may detect a facial image from a background screen of a home screen page, and control the display module 151' of the cover unit 1400 to output a region where the facial image is output.

Accordingly, only a background screen can be provided without a plurality of graphic objects which are output by overlapping the display unit of the cover unit 1400.

The foregoing description has been given of the method of setting the image to be output on the display unit of the cover unit.

The present invention can provide an image output on a specific region of a home screen page, in a manner of preventing a plurality of graphic objects included on the home screen page from being output on the specific region of the home screen page. This may allow a user to use a screen on which a specific portion of an image set to a background screen is not obscured.

Also, the present invention can associate a specific region without a graphic object output thereon with a function relevant to an image output on the specific region, on a background screen of a home screen page. This may allow the user to use various functions with respect to an image on the home screen page. In addition, the user can execute various functions using a region, on which a graphic object is not output on a home screen page.

Further, the present disclosure can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal. Therefore, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display; and
a controller configured to:
cause the display to display a home screen page comprising a plurality of graphic objects;
set a specific region of the home screen page based on a first touch input received on the home screen page, the first touch input received while the plurality of graphic objects are displayed on the home screen page;
cause the display to display a guide image indicating the specific region when the specific region is set, the guide image displayed on the home screen page comprising the plurality of graphic objects;
detect a graphic object displayed in the specific region or overlapping the specific region when the specific region is set, wherein a visual effect is applied to the detected graphic object such that the detected graphic object is visually distinguished from other graphic objects of the plurality of graphic objects;
cause the display to display a plurality of images indicating expected output regions where the detected graphic object is to be displayed while the graphic object and the guide image are displayed on the home screen page, wherein the plurality of images are displayed outside of the specific region;
cause the display to display the detected graphic object at a first region of the home screen page corresponding to a first image of the plurality of images in response to a second touch input received at the first image, the second touch input received while the graphic object and the plurality of images are displayed on the home screen page; and
cause the display to stop displaying the plurality of images when the graphic object is displayed at the first region of the home screen page,
wherein the first image is replaced by the graphic object when the graphic object is displayed at the first region of the home screen page such that the graphic object is no longer displayed in the specific region or overlapping the specific region.

2. The mobile terminal of claim 1, wherein:
the graphic object displayed in the specific region or overlapping the specific region is one of the plurality of graphic objects; and
the controller is further configured to cause the graphic object to move from the specific region to the first region.

3. The mobile terminal of claim 2, wherein:
the home screen page is divided into at least two virtual regions based on a preset reference line; and
the controller is further configured to cause the graphic object displayed on the specific region within one of the at least two virtual regions to move to the first region.

4. The mobile terminal of claim 3, wherein when it is impossible to move the graphic object within the one virtual region, the controller is further configured to cause the graphic object displayed on the specific region to move to another virtual region according to a preset order.

5. The mobile terminal of claim 2, wherein the controller is further configured to:
detect a size of each of the plurality of graphic objects, and
cause the display to display the plurality of graphic objects in a different size compared with the size of each of the plurality of graphic objects according to a preset condition when the graphic object displayed on the specific region is moved.

6. The mobile terminal of claim 1, wherein the controller is further configured to cause the display to display the plurality of graphic objects on a second region, except for the specific region, according to sizes of the plurality of graphic objects.

7. The mobile terminal of claim 1, wherein the home screen page further comprises a background image,
wherein the mobile terminal further comprises a memory configured to store history information indicating the background image and an arrangement state of the plurality of graphic objects on the background image, and
wherein the controller is further configured to detect at least one image to be displayed on the background image of the home screen page using the history information stored in the memory.

8. The mobile terminal of claim 7, wherein the memory stores the history information indicating a plurality of background images and an arrangement state of graphic objects on each of the background images, and
wherein when one of a plurality of history information stored in the memory is selected, the controller is further configured to:
cause the display to display one of the plurality of background images on the home screen page as a background; and
arrange the plurality of graphic objects displayed on the home screen page on the basis of an arrangement state of graphic objects associated with the one of the plurality of background images.

9. The mobile terminal of claim 1, wherein the controller is further configured to execute a function associated with one of the plurality of graphic objects when a third touch input is sensed on the one of the plurality of graphic objects.

10. The mobile terminal of claim 1, wherein the controller is further configured to cause the display to display the detected graphic object at a second region of the home screen corresponding to a second image of the plurality of images when a third touch input is received at the second image instead of the second touch input received at the first image.

11. The mobile terminal of claim 1, wherein a size of each of the plurality of graphic objects and a size of each of the plurality of images are same.

12. The mobile terminal of claim 11, wherein a shape of each of the plurality of graphic objects and a shape of each of the plurality of images are same.

13. The mobile terminal of claim 1, wherein the detected graphic object is visually distinguished by being changed in at least one of a size, a color, or transparency of the graphic object or by applying an animation effect to the graphic object.

14. The mobile terminal of claim 1, wherein the second touch input is received while the detected graphic object is displayed visually distinguishably from the other graphic objects.

15. A method of controlling a mobile terminal, the method comprising:
displaying a home screen page comprising a plurality of graphic objects on a display of the mobile terminal;
setting a specific region of the home screen page based on a first touch input received on the home screen page;
displaying a guide image indicating the specific region on the home screen page when the specific region is set, the guide image displayed on the home screen page comprising the plurality of graphic objects;
detecting a graphic object displayed in the specific region or overlapping the specific region when the specific region is set, wherein a visual effect is applied to the detected graphic object such that the detected graphic object is visually distinguished from other graphic objects of the plurality of graphic objects;
displaying a plurality of images indicating expected output regions where the detected graphic object is to be displayed while the graphic object is displayed on the home screen page, wherein the plurality of images are displayed outside of the specific region;
displaying the detected graphic object at a first region of the home screen page corresponding to a first image of the plurality of images in response to a second touch input received at the first image, the second touch input received while the graphic object and the plurality of images are displayed on the home screen page; and
stopping the displaying of the plurality of images when the graphic object is displayed at the first region of the home screen page,
wherein the first image is replaced by the graphic object when the graphic object is displayed at the first region of the home screen page such that the graphic object is no longer displayed in the specific region or overlapping the specific region.

16. The method of claim 15, wherein when the first image is selected by the second touch input, the selected first image is displayed such that the selected first image of the plurality of images is visually distinguished from a non-selected image of the plurality of images.

* * * * *